United States Patent
Nakagawa et al.

(10) Patent No.: US 10,157,445 B2
(45) Date of Patent: Dec. 18, 2018

(54) IMAGE GENERATING APPARATUS, IMAGE GENERATING METHOD, AND PROGRAM

(71) Applicants: Daisuke Nakagawa, Tokyo (JP); Norihiko Kawai, Nara (JP); Tomokazu Sato, Nara (JP); Naokazu Yokoya, Nara (JP)

(72) Inventors: Daisuke Nakagawa, Tokyo (JP); Norihiko Kawai, Nara (JP); Tomokazu Sato, Nara (JP); Naokazu Yokoya, Nara (JP)

(73) Assignees: Ricoh Company, Ltd., Tokyo (JP); National University Corporation Nara Institute of Science and Technology, Nara (JP)

( * ) Notice: Subject to any disclaimer, the term of this patent is extended or adjusted under 35 U.S.C. 154(b) by 106 days.

(21) Appl. No.: 15/037,757

(22) PCT Filed: Dec. 11, 2014

(86) PCT No.: PCT/JP2014/083493
§ 371 (c)(1),
(2) Date: May 19, 2016

(87) PCT Pub. No.: WO2015/093553
PCT Pub. Date: Jun. 25, 2015

(65) Prior Publication Data
US 2016/0300323 A1    Oct. 13, 2016

(30) Foreign Application Priority Data

Dec. 20, 2013 (JP) ................................. 2013-264019

(51) Int. Cl.
*G06K 9/00* (2006.01)
*G06T 3/00* (2006.01)

(52) U.S. Cl.
CPC .. *G06T 3/0062* (2013.01); *G06T 2207/10004* (2013.01)

(58) Field of Classification Search
CPC .................... G06T 3/0062; G06T 2207/10004
See application file for complete search history.

(56) References Cited

U.S. PATENT DOCUMENTS

| 5,657,073 A | 8/1997 | Henley |
| 8,120,991 B2 * | 2/2012 | Koren ...................... G01V 1/32 345/428 |

(Continued)

FOREIGN PATENT DOCUMENTS

| JP | 4242381 | 3/2009 |
| JP | 2011-035567 | 2/2011 |

(Continued)

OTHER PUBLICATIONS

The Extended European search report dated Nov. 17, 2016.

(Continued)

*Primary Examiner* — Jonathan S Lee
(74) *Attorney, Agent, or Firm* — IPUSA, PLLC

(57) ABSTRACT

An image generating apparatus for generating an output image based on an input panorama image, includes a parameter input unit inputting an output range parameter and a correction parameter, the output range parameter designating an output range in the panorama image, the correction parameter designating a correction part to be corrected in the output image; and an image correction unit correcting the correction part designated by the correction parameter in the output image. Further, the image correction unit calculates a similarity between the correction part and peripheral pixels and corrects the correction part based on the similarity and the peripheral pixels, and the output image is generated from (Continued)

the output range of the panorama image and is the panorama image corrected by the correction.

10 Claims, 25 Drawing Sheets

(56) References Cited

U.S. PATENT DOCUMENTS

| | | | | |
|---|---|---|---|---|
| 2004/0247173 | A1* | 12/2004 | Nielsen | G06T 3/0062 382/154 |
| 2007/0030396 | A1* | 2/2007 | Zhou | G06F 17/30802 348/700 |
| 2008/0109168 | A1* | 5/2008 | Koren | G01V 1/32 702/16 |
| 2013/0057542 | A1 | 3/2013 | Takenaka et al. | |
| 2014/0204248 | A1 | 7/2014 | Kawai et al. | |
| 2014/0314336 | A1* | 10/2014 | Yagi | G06T 3/0062 382/282 |
| 2014/0347439 | A1* | 11/2014 | Jia | H04N 5/23238 348/36 |
| 2015/0016746 | A1 | 1/2015 | Tsubota et al. | |

FOREIGN PATENT DOCUMENTS

| | | |
|---|---|---|
| JP | 2013-182333 | 9/2013 |
| WO | 2009/142333 | 11/2009 |
| WO | 2013/046827 | 4/2013 |
| WO | 2013/114848 | 8/2013 |

OTHER PUBLICATIONS

Paredes Daniel et al: "Catadioptric omnidirectional image inpainting via a multi-scale approach and image unwrapping", 2013 IEEE International Symposium on Robotic and Sensors Environments (ROSE), IEEE, Oct. 21, 2013 (Oct. 21, 2013), pp. 67-72, XP032546295, DOI: 10.1109/ROSE.2013.6698420, [retrieved on Dec. 30, 2013].
Nidhi Arora et al: "Interactive Image Restoration Using Inpainting and Denoising", Computer Vision, Pattern Recognition, Image Processing and Graphics (NCVPRIPG), 2011 Third National Conference on, IEEE, Dec. 15, 2011 (Dec. 15, 2011), pp. 219-222, XP032099054, DOI: 10.1109/NCVPRIPG.2011.54, ISBN: 978-1-4577-2102-1.
Komodakis N: "Image Completion Using Global Optimization", Conference on Computer Vision and Pattern Recognition, 2006 IEEE Computer Society, New York, NY, USA Jun. 17-22, 2006, IEEE, Piscataway, NJ, USA, vol. 1, Jun. 17, 2006 (Jun. 17, 2006), pp. 442-452, XP010922852, DOI: 10.1109/CVPR.2006.141, ISBN: 978-0-7695-2597-6.
Komodakis N et al: "Image Completion Using Efficient Belief Propagation via Priority Scheduling and Dynamic Pruning", IEEE Transactions on Image Processing, IEEE Service Center, Piscataway, NJ, US, vol. 16, No. 11, Nov. 1, 2007 (Nov. 1, 2007), pp. 2649-2661, XP011193294, ISSN: 1057-7149, DOI: 10.1109/TIP.2007.906269.
Guillemot Christine et al: "Image Inpainting: Overview and Recent Advances", IEEE Signal Processing Magazine, IEEE Service Center, Piscataway, NJ, US, vol. 31, No. 1, Dec. 3, 2013 (Dec. 3, 2013), pp. 127-144, XP011533102, ISSN: 1053-5888, DOI: 10.1109/MSP.2013.2273004 [retrieved on Dec. 3, 2013].
Canadian Office Action for 2,932,303 dated Apr. 3, 2017.
Kotaro Machikita et al., "Realization of Omnidirectional Telepresence without Invisible Areas Using an Omnidirectional Camera Based on Video Inpainting", Meeting on Image Recognition and Understanding, Jul. 2009.
Norihiko Kawai et al., "Image Inpainting by Minimizing Energy Function Based on Pattern Similarity Considering Brightness Change and Spatial Locality".
Yonatan Wexler et al., "Space-Time Completion of Video", IEEE Transactions on Pattern Analysis and Machine Intelligence, vol. 29, No. 3, pp. 463-476, Mar. 2007.
International Search Report dated Mar. 31, 2015 in PCT/JP2014/083493 filed on Dec. 11, 2014.
Singaporean Office Action dated Aug. 29, 2016.
"Application of Image Correction Technique in the Panorama Monitoring", Yingwang etc., «Automation and Meter», period 3 of year 2011, pp. 9-11, with English Abstract.
Office Action dated May 29, 2018 issued with respect to the corresponding Chinese Patent Application No. 201480068512.X.

* cited by examiner

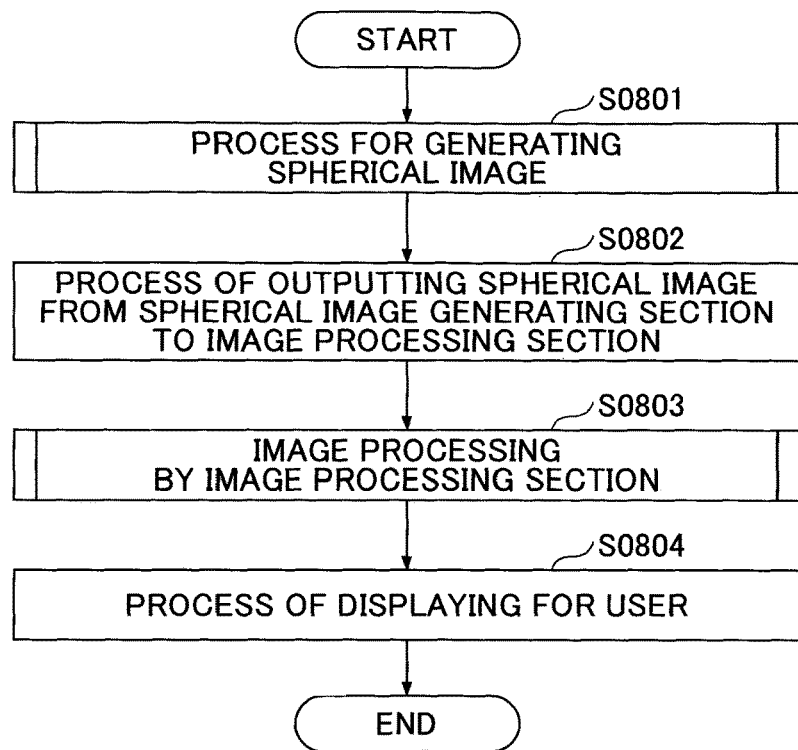
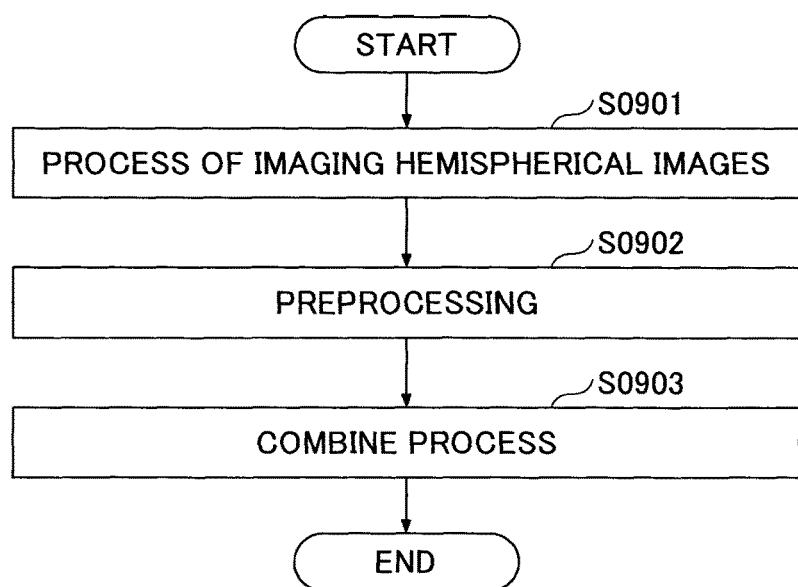

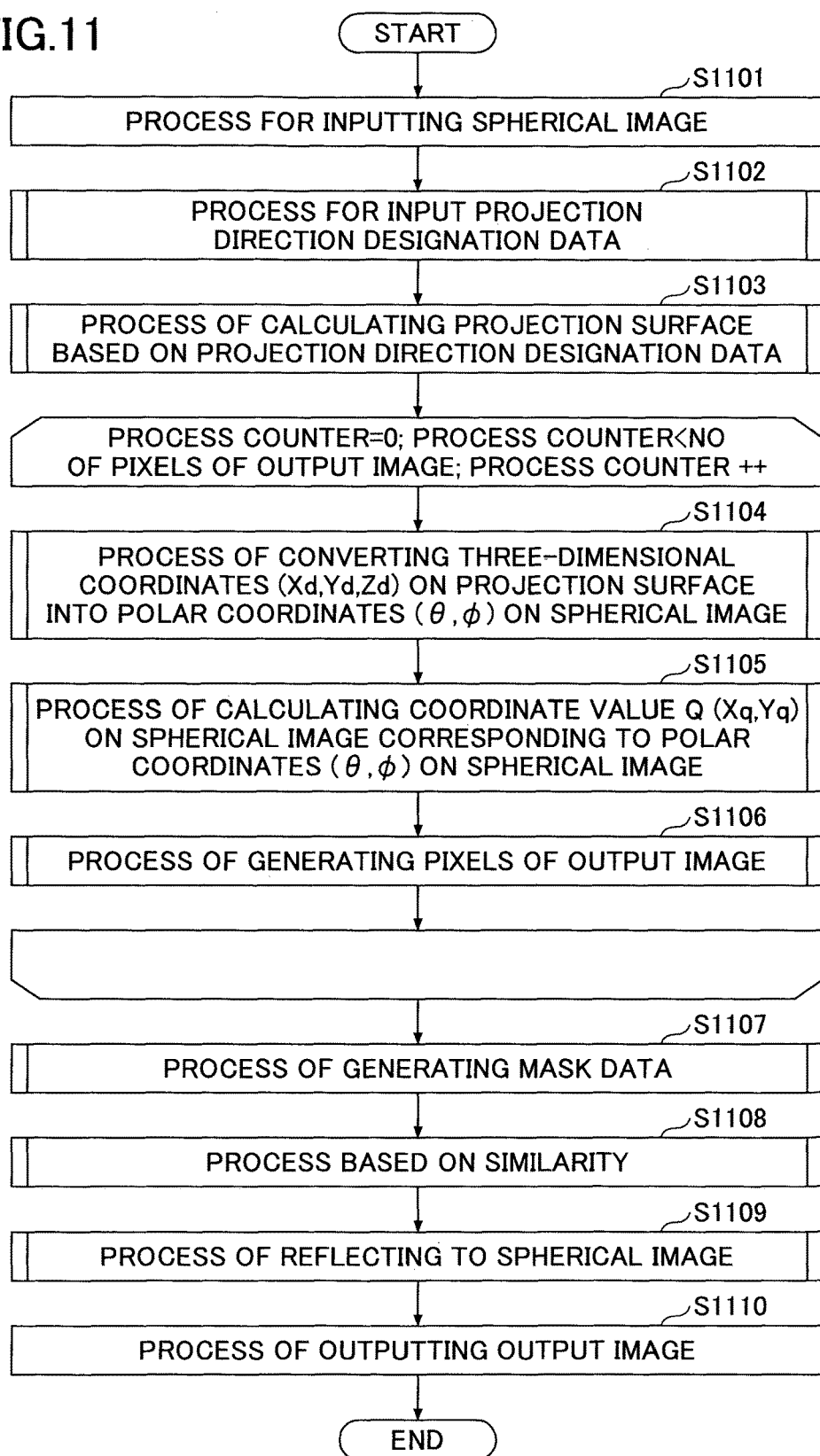

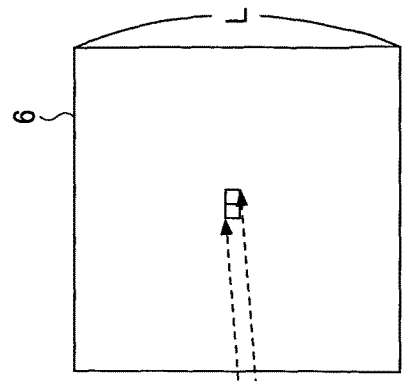
FIG.16C
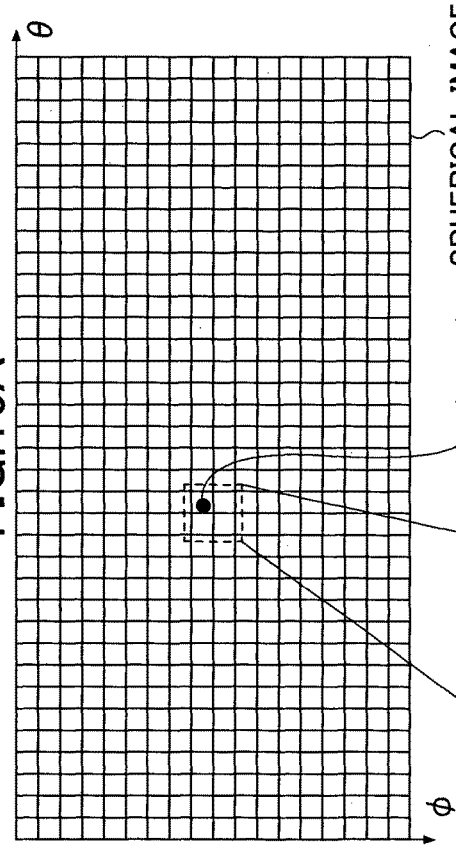
FIG.16A
FIG.16B
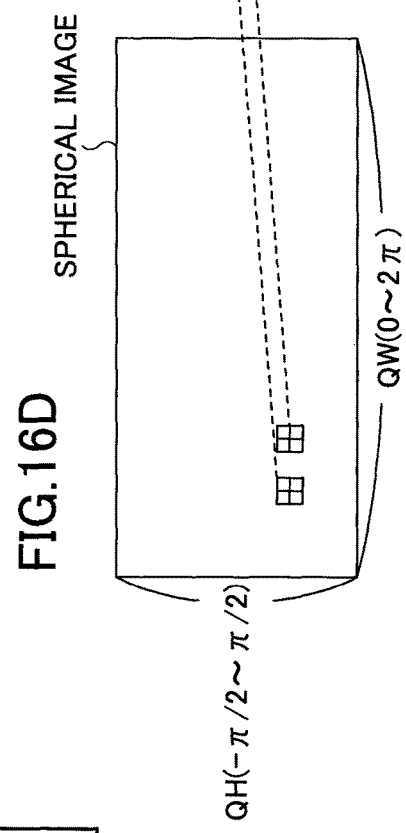
FIG.16D

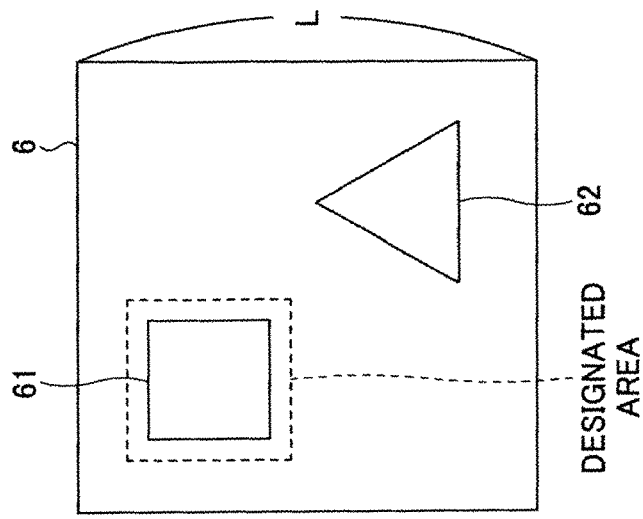
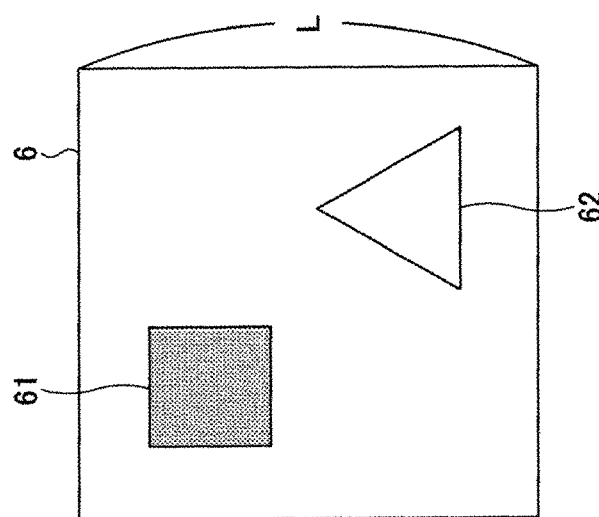
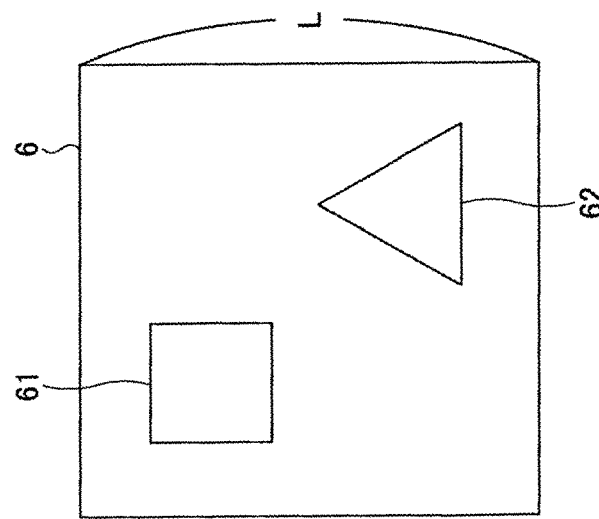

FIG.19A
FIG.19B
FIG.19C
FIG.19D
FIG.19E
FIG.19F
FIG.19G
FIG.19H

SET VALUE TO "10000"

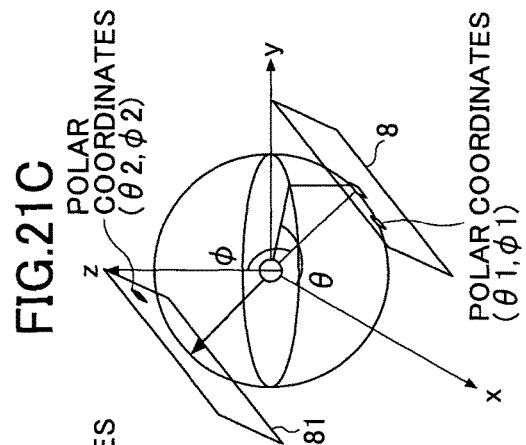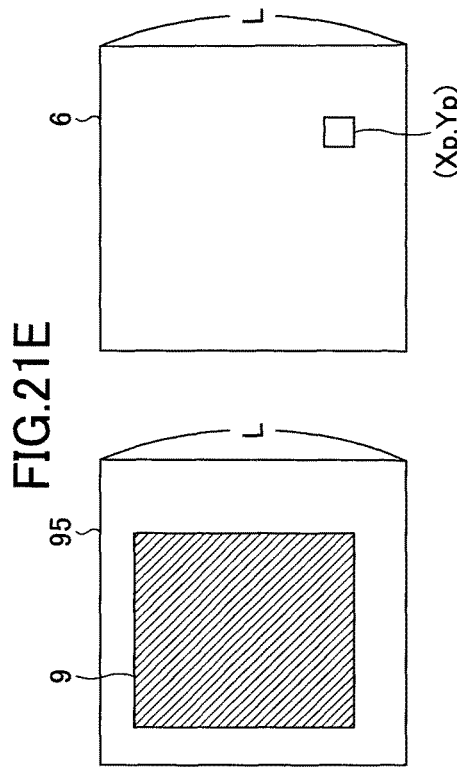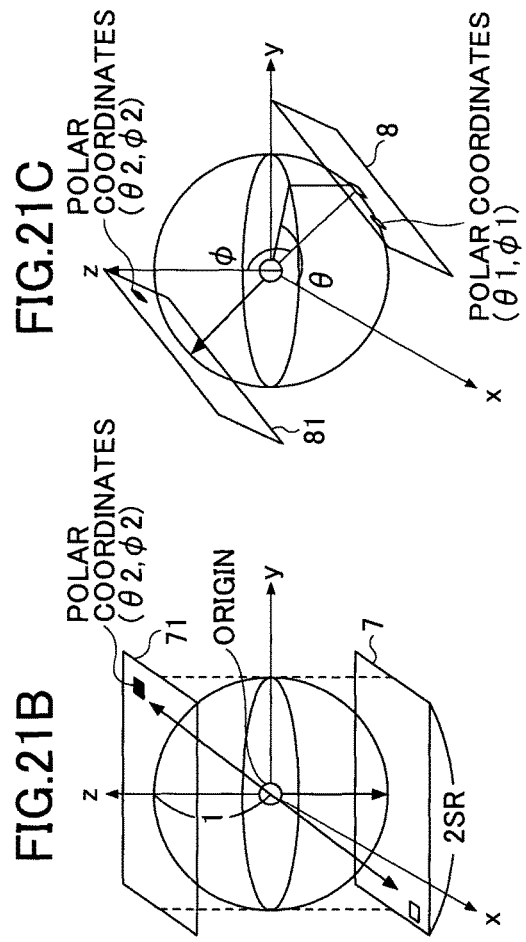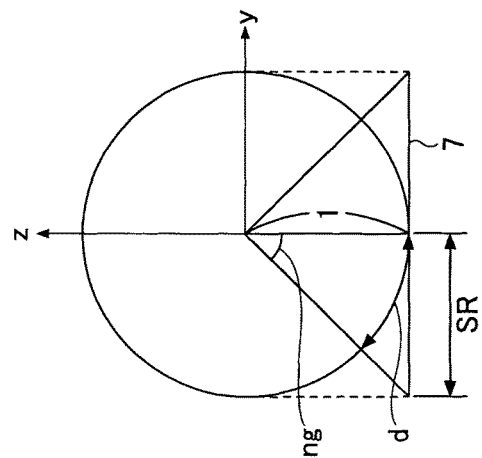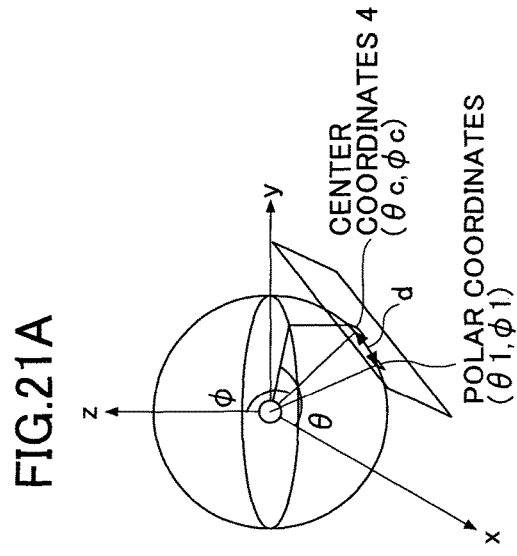

63

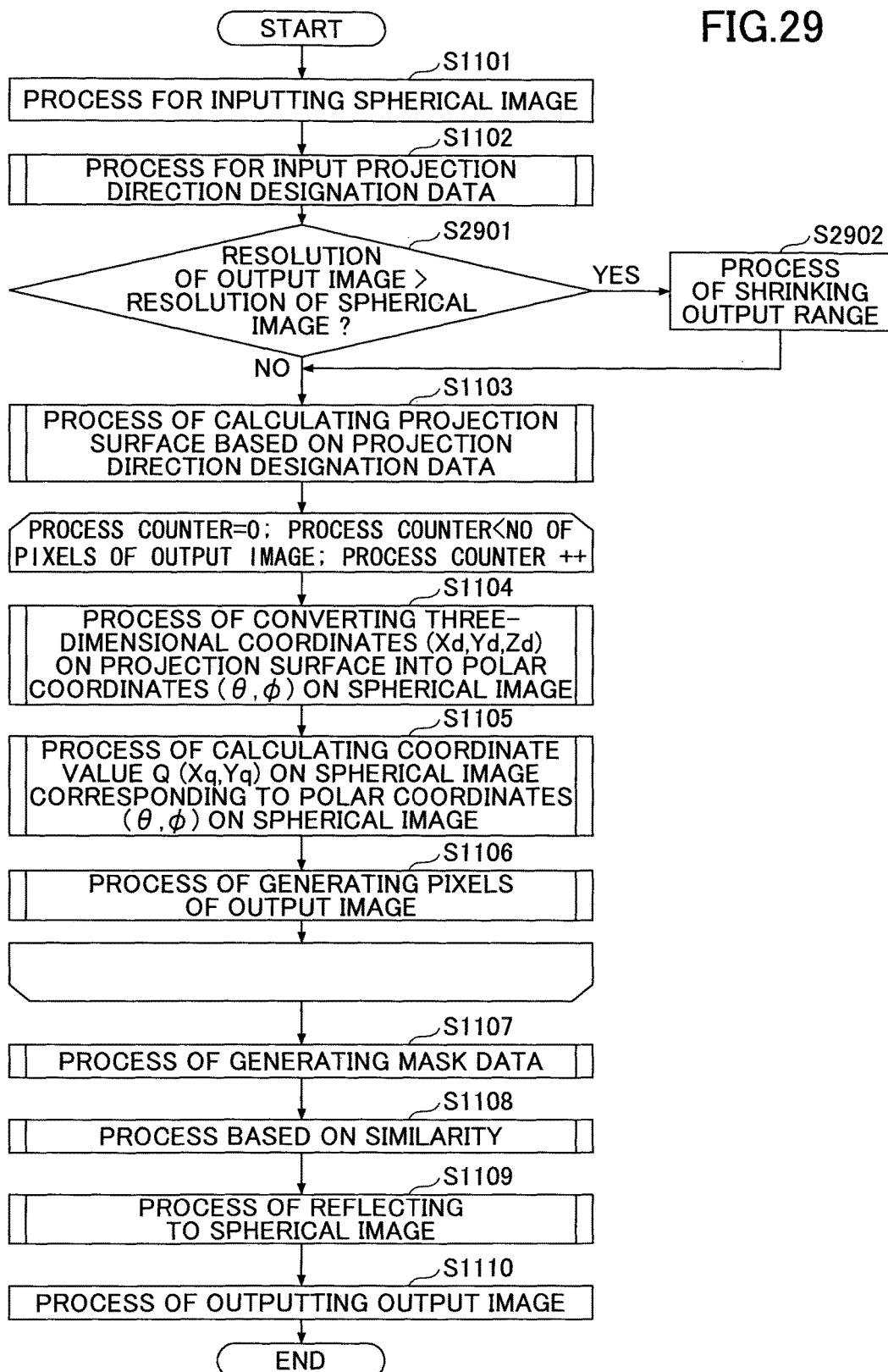

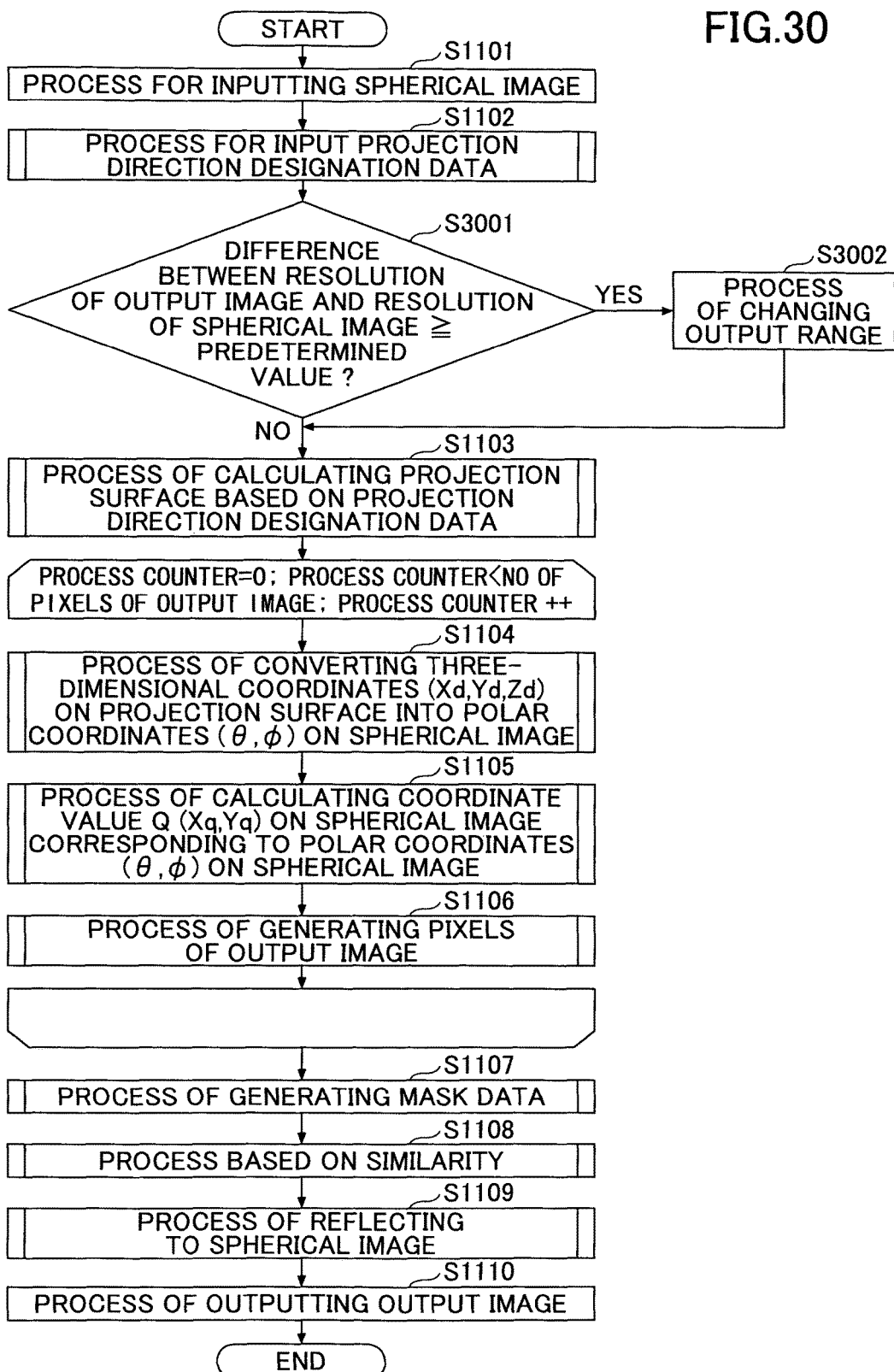

IMAGE GENERATING APPARATUS, IMAGE GENERATING METHOD, AND PROGRAM

TECHNICAL FIELD

The present invention relates to an image generating apparatus, an image generating method, and a program.

BACKGROUND ART

Conventionally, there is a known method of correcting a damaged image in an image processing apparatus (see, for example, Patent Document 1).

Further, there is a known method of correcting a damaged image in the gravitational direction corresponding to a blind angle of an imaging device in an omnidirectional video image imaged by the imaging device capable of imaging a wide range (see, for example, Non Patent Document 1).

SUMMARY OF THE INVENTION

Problems to be Solved by the Invention

However, in a conventional method, in a case where, for example, an image is formed by an imaging device having two fisheye lens optical systems, it is not possible to arbitrarily set a portion to be corrected. Therefore, when there is a part which is necessary to be corrected other than the gravitational direction in the image, it may be difficult to correct the part.

According to one aspect of the present invention, an object is to provide an image generating apparatus capable of correcting an arbitrary part of an image that is formed by an imaging device.

Means for Solving the Problems

According to an aspect of the present invention, an image generating apparatus for generating an output image based on an input panorama image, includes a parameter input unit inputting an output range parameter and a correction parameter, the output range parameter designating an output range in the panorama image, the correction parameter designating a correction part to be corrected in the output image, and an image correction unit correcting the correction part designated by the correction parameter in the output image.

Further, the image correction unit calculates a similarity between the correction part and peripheral pixels and corrects the correction part in the output image based on the similarity and the peripheral pixels, and the output image is generated from the output range of the panorama image, the output range being designated by the output range parameter, and is the panorama image corrected by the correction.

Effects of the Present Invention

It becomes possible to correct an arbitrary part of an image that is formed by an imaging device according to an aspect of the present invention.

BRIEF DESCRIPTION OF THE DRAWINGS

FIG. 8 is a flowchart illustrating an example overall process by the imaging system according to an embodiment of the present invention;

FIG. 9 is a flowchart illustrating an example process of generating a spherical image according to an embodiment of the present invention;

FIG. 11 is a flowchart illustrating an example process by the image processing apparatus according to an embodiment of the present invention;

FIGS. 16A through 16D are drawings illustrating an example process of generating a pixel of an output image according to an embodiment of the present invention;

FIGS. 17A through 17C are drawings illustrating an example mask data generation process according to an embodiment of the present invention;

FIGS. 19A through 19H are drawings illustrating an example process based on similarity according to an embodiment of the present invention;

FIGS. 21A through 21E are drawing illustrating an example reflecting process onto the spherical image according to an embodiment of the present invention;

FIG. 29 is a flowchart illustrating an example process performed by the image processing apparatus according to a third embodiment; and FIG. 30 is a flowchart illustrating an example process performed by the image processing apparatus according to a fourth embodiment.

BEST MODE FOR CARRYING OUT THE INVENTION

Figure 1:
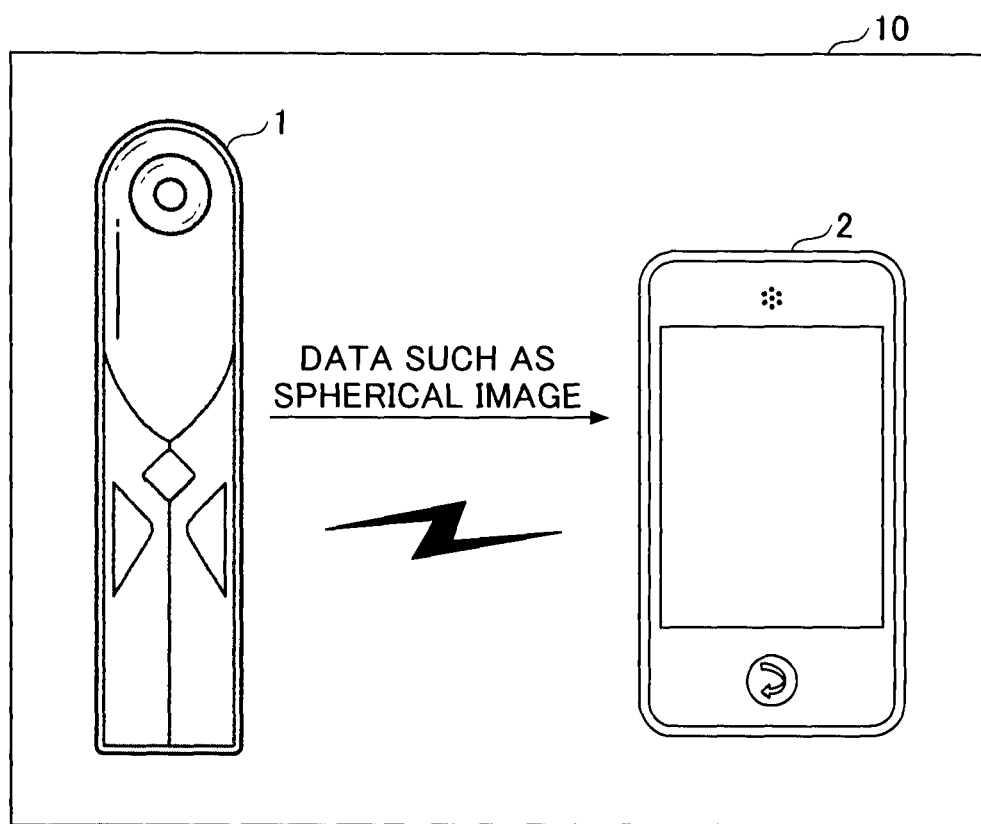
FIG. 1 is a drawing illustrating an example overall configuration of an imaging system according to an embodiment of the present invention.

In the following, embodiments of the present invention are described.
First Embodiment
Overall Configuration FIG. 1 is a drawing illustrating an example overall configuration of an imaging system according to an embodiment of the present invention.

An imaging system 10 includes an imaging device 1 and an image processing apparatus 2.

The imaging device 1 includes plural optical systems, so as to generate an image of a wide range such as, for example, an omnidirectional range of the imaging device 1 (hereinafter referred to as a "spherical image"), and output the spherical image to the image processing apparatus 2. Details of the imaging device 1 and the spherical image are described below. A panorama image refers to, for example, the spherical image. In the following, the panorama image is described as an example of the spherical image.

The image processing apparatus 2 performs image processing on the spherical image that is input from the imaging device 1, and outputs the image processed spherical image. Details of the image processing apparatus 2 are described below.

The imaging device 1 and the image processing apparatus 2 are connected via a wired or wireless interface. For example, the image processing apparatus 2 downloads data such as the spherical image output from the imaging device 1, so as to input the data into the image processing apparatus 2.

The connection method between the imaging device 1 and the image processing apparatus 2 is not limited to the wired or wireless interface. For example, the imaging device 1 and the image processing apparatus 2 may have an interface to connect a recording medium such as a flash memory (registered trademark), so that data can be input and output via the recording medium. Further, the connection method between the imaging device 1 and the image processing apparatus 2 may be a connection via a network (not shown) such as the Internet.

Note that, the overall configuration is not limited to the configuration of FIG. 1. For example, the imaging device 1 and the image processing apparatus 2 may be integrated into a single apparatus. Further, the overall configuration may include not only the imaging device 1 and the image processing apparatus 2 but also another connected computer, so as to include three or more apparatuses in the system.
Imaging Device FIGS. 2A through 2C are drawings illustrating an example imaging device 1 according to an embodiment of the present invention.

Figure 2C:
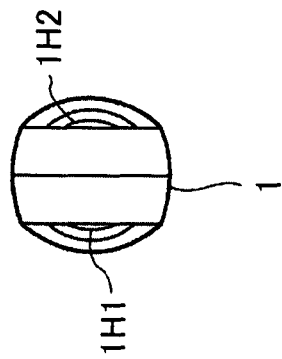
FIGS. 2A through 2C are drawings illustrating an example imaging device according to an embodiment of the present invention.
Figure 2B:
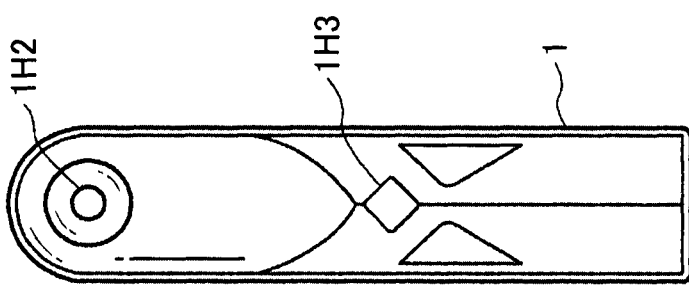
Figure 2A:
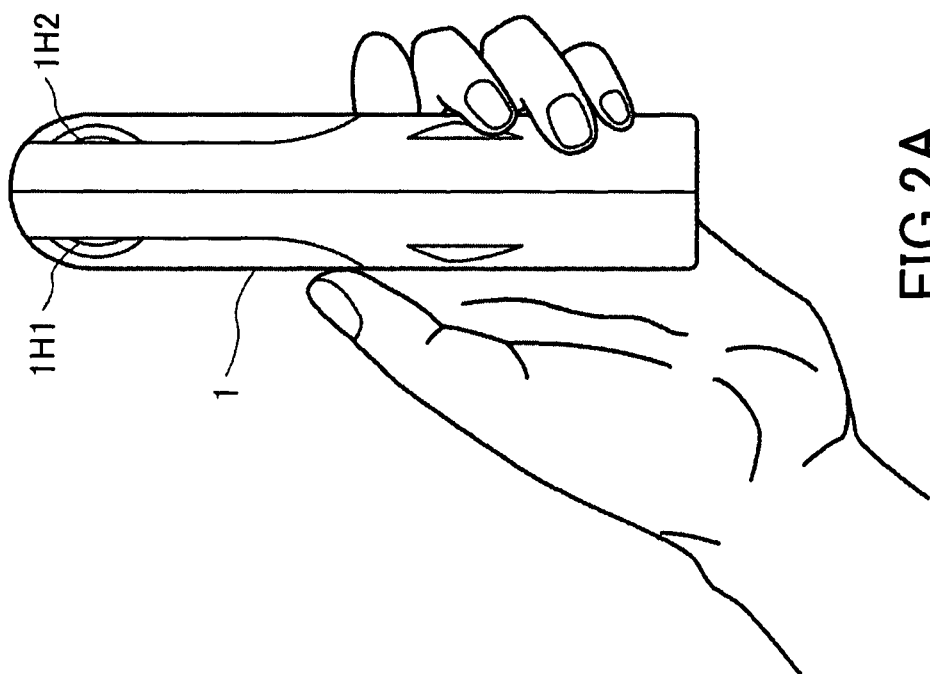

FIGS. 2A through 2C are drawings illustrating an example exterior appearance of the imaging device 1. FIG. 2A is an example front view of the imaging device 1. FIG. 2B is an example left side view of the imaging device 1. FIG. 2C is an example top view of the imaging device 1.

The imaging device 1 includes a front-surface imaging element 1H1, a rear-surface imaging element 1H2, and a switch 1H3.

By using an image formed (imaged) by the surface imaging element 1H1 and an image formed by the rear-surface imaging element 1H2, the imaging device 1 generates the spherical image.

The switch 1H3 is a so-called "shutter button" and is an input device to issue an instruction to the imaging device 1 for imaging.

A user holds the imaging device 1 as illustrated in FIG. 2A and presses the switch 1H3, so that the imaging device 1 performs imaging.

Figure 3:
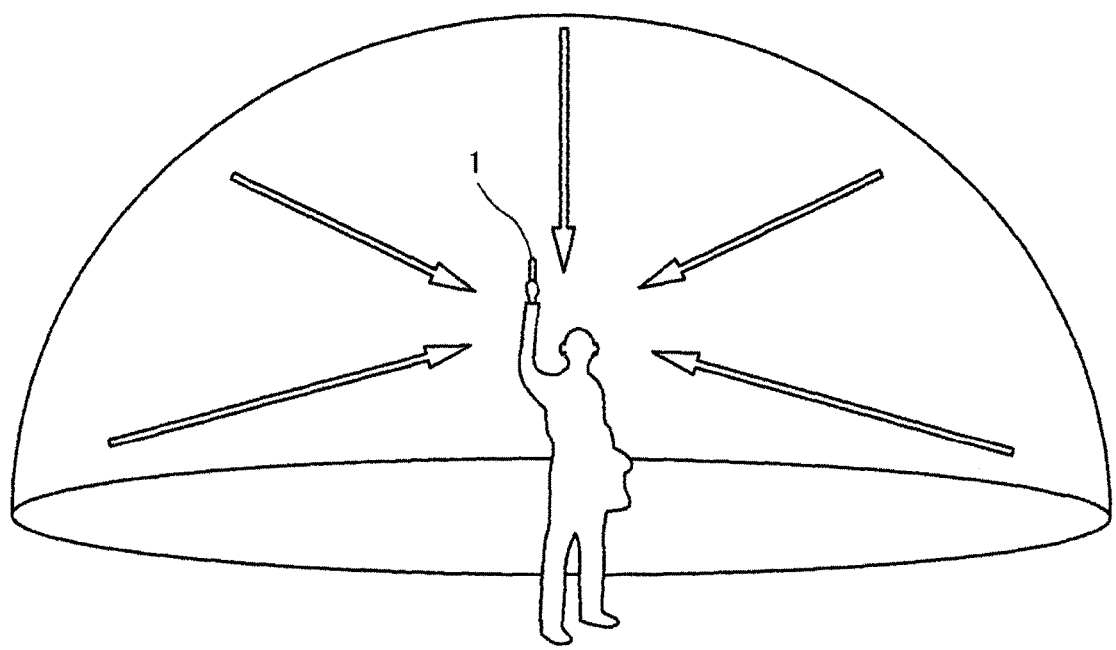
FIG. 3 is a drawing illustrating an example of imaging by the imaging device according to an embodiment of the present invention.

FIG. 3 is a drawing illustrating example imaging by the imaging device 1 according to an embodiment of the present invention.

As illustrated in FIG. 3, a user holds the imaging device 1 by the hand and presses the switch 1H3 of FIG. 2B for imaging. The imaging device 1 can form an omnidirectional image of the imaging device 1 by using the front-surface imaging element 1H1 of FIG. 2A and the rear-surface imaging element 1H2 of FIG. 2A.

Figure 4C:
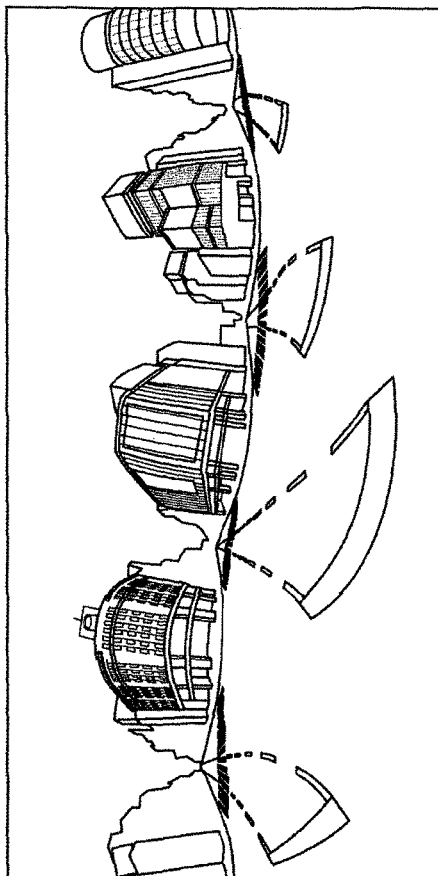
FIGS. 4A through 4C are drawings illustrating an example image that is imaged by the imaging device according to an embodiment of the present invention.
Figure 4A:
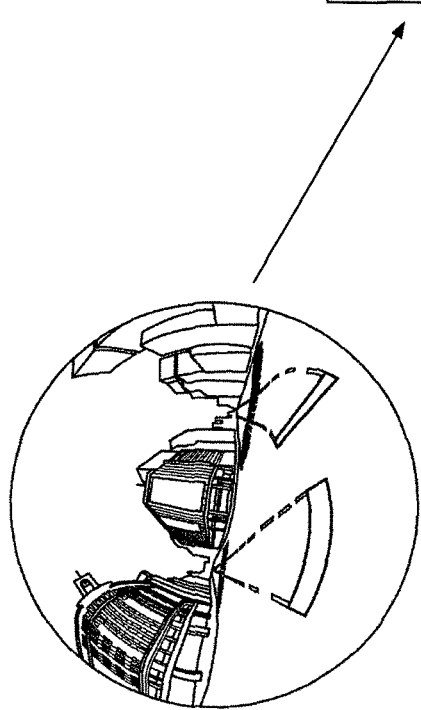
Figure 4B:
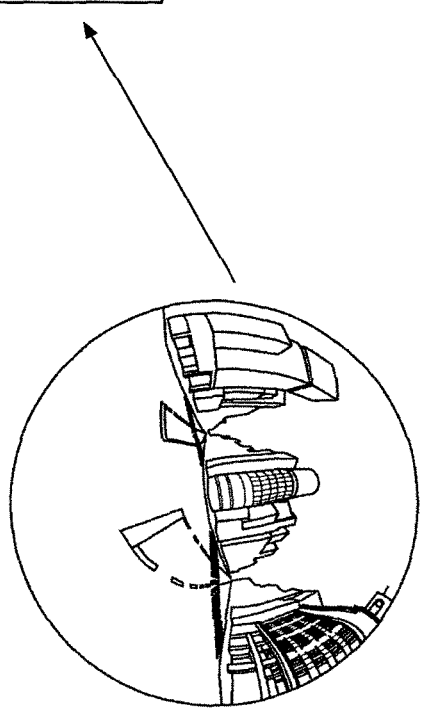

FIGS. 4A through 4C are drawings illustrating an example image that is formed by the imaging device according to an embodiment of the present invention.

FIG. 4A illustrates an example image that is formed by the front-surface imaging element 1H1 of FIG. 2A. FIG. 4B illustrates an example image that is formed by the rear-surface imaging element 1H2 of FIG. 2A. FIG. 4C illustrates an example image that is generated based on the image that is formed by the front-surface imaging element 1H1 of FIG. 2A and the image that is formed by the rear-surface imaging element 1H2 of FIG. 2A.

The image that is formed by the front-surface imaging element 1H1 of FIG. 2A is a wide range image, the imaging range in the front direction of the imaging device 1 being such as a 180-degree range as the field angle as illustrated in FIG. 4A. When the front-surface imaging element 1H1 of FIG. 2A uses an optical system such as a so-called "fisheye lens" to form an image in a wide range, the image that is formed by the front-surface imaging element 1H1 of FIG. 2A includes distortions as illustrated in FIG. 4A. The image of FIG. 4A that is formed by the front-surface imaging element 1H1 of FIG. 2A is a hemispherical image that has a wide range of one side of the imaging device 1 and has the distortions (hereinafter referred to as a "hemispherical image").

The image that is formed by the rear-surface imaging element 1H2 of FIG. 2A is a wide range image, the imaging range in the rear direction of the imaging device 1 being such as a 180-degree range as the field angle as illustrated in FIG. 4B.

Similar to the image of FIG. 4A, the image that is formed by the rear-surface imaging element 1H2 of FIG. 2A is also a hemispherical image.

The imaging device 1 performs processes such as a distortion correction process and a combining process which are described below to generate an image as illustrated in FIG. 4C based on the front hemispherical image of FIG. 4A and the rear hemispherical image of FIG. 4B. The image of FIG. 4C is a Mercator image that is generated by, for example, a so-called "Mercator projection", that is, the spherical image.

Hardware Configuration of Imaging Device

Figure 5:
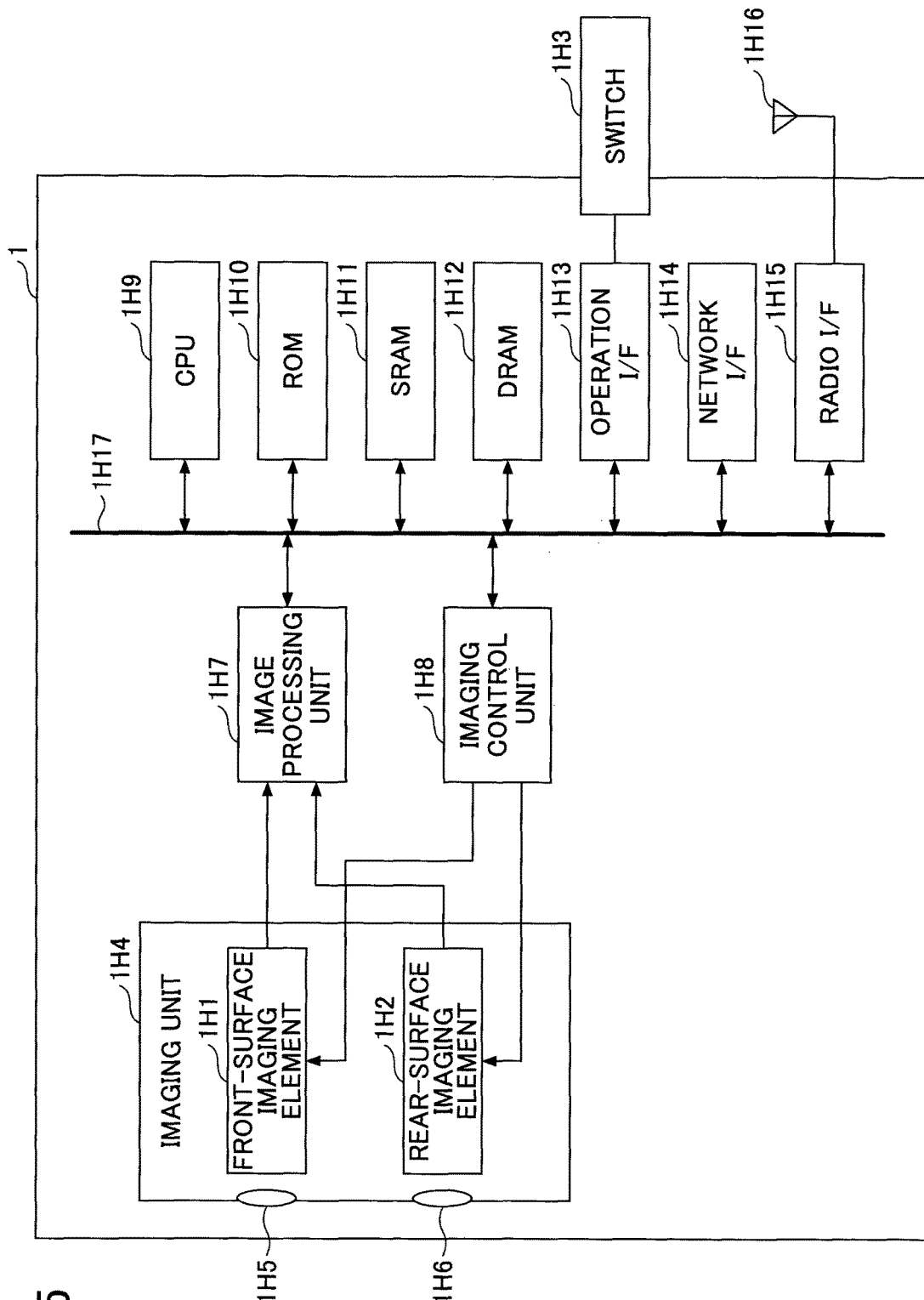
FIG. 5 is a block diagram of an example hardware configuration of the imaging device according to an embodiment of the present invention.

FIG. 5 is a block diagram illustrating an example hardware configuration of the imaging device according to an embodiment.

The imaging device 1 includes an imaging unit 1H4, an image processing unit 1H7, an imaging control unit 1H8, a Central Processing Unit (CPU) 1H9, and a Read-Only Memory (ROM) 1H10. The imaging device 1 further includes a Static Random Access Memory (SRAM) 1H11, a Dynamic Random Access Memory (DRAM) 1H12, and an operation Interface (I/F) 1H13. The imaging device 1 further includes a network I/F 1H14, a radio I/F 1H15, and an antenna 1H16. Those elements of the imaging device 1 are connected to each other via a bus 1H17 (as illustrated in FIG. 5), so as to input and output data or signals.

The imaging unit 1H4 includes the front-surface imaging element 1H1 and the rear-surface imaging element 1H2. The imaging unit 1H4 includes a lens 1H5 which corresponds to the front-surface imaging element 1H1 and a lens 1H6 which corresponds to the rear-surface imaging element 1H2. The front-surface imaging element 1H1 and the rear-surface imaging element 1H2 are a so-called "camera unit". The front-surface imaging element 1H1 and the rear-surface imaging element 1H2 include an optical sensor (not shown) such as a Complementary Metal Oxide Semiconductor (CMOS), a Charge Coupled Device (CCD), etc. The front-surface imaging element 1H1 converts the light incident through the lens 1H5 and performs a process to generate image data. The rear-surface imaging element 1H2 converts the light incident through the lens 1H6 and performs the process to generate image data. The imaging unit 1H4 outputs a set of image data, which are generated by the front-surface imaging element 1H1 and the rear-surface imaging element 1H2, to the image processing unit 1H7. The "image data" refers to, for example, the front hemispherical image of FIG. 4A and the rear hemispherical image of FIG. 4B.

In order to acquire a high-quality image, the front-surface imaging element 1H1 and the rear-surface imaging element 1H2 may further include other optical elements (not shown) such as a diaphragm, a low pass filter, etc., in addition to the lens. Further, for the high-quality imaging, the front-surface imaging element 1H1 and the rear-surface imaging element 1H2 may perform processes such as a so-called "defective pixel correction" or "camera shake correction (blurring correction)", etc.

The image processing unit 1H7 performs a process of generating the spherical image of FIG. 4C based on the image data which is input from the imaging unit 1H4. Details of the process of generating the spherical image are described below. Here, a part or all of the process of the image processing unit 1H7 may be performed in parallel or redundantly by another computer.

The imaging control unit 1H8 is a control device to control the elements of the imaging device 1.

The CPU 1H9 performs calculations and control for the processes of the imaging device 1. For example, the CPU 1H9 executes various programs. In order to achieve higher speed by parallel processing, the CPU 1H9 may include multiple CPUs, devices, or multiple cores. Further, an additional hardware resource (not shown) may be provided inside or outside of the imaging device 1, so that a part or all of the processes of the imaging device 1 (CPU 1H9) may be performed by the additional hardware resource.

The ROM 1H10, the SRAM 1H11, and the DRAM 1H12 are examples of a storage device. The ROM 1H10 stores, for example, a program to be executed by the CPU 1H9, data, or parameters. The SRAM 1H11 and the DRAM 1H12 store, for example, programs, data used by the program, data generated by the program or parameters when the CPU 1H9 executes the program. The "storage device" herein refers to a memory, which includes, for example, a Magnetic Random Access Memory (MRAM). The imaging device 1 may further include an auxiliary storage device (not shown) such as a hard disk.

The operation I/F 1H13 is an interface such as the switch 1H3 on which a user performs input operations to the imaging device 1. Specifically, the operation I/F 1H13 includes an operation device such as a switch, a connector (not shown) to connect an operation device, a cable (not shown), a circuit (not shown) to perform a process on a signal input from the operation device, a driver (not shown), a control device (not shown), etc. The operation I/F 1H13 may further include an output device (not shown) such as a display. Further, the operation I/F 1H13 may be a touch panel including input and output devices integrated into a single body. The operation I/F 1H13 may further include an interface (not shown) for such as a Universal Serial Bus (USB), so as to input and output data into and from the imaging device 1 by connecting a recording medium such as a flash memory (registered trademark).

The switch 1H3 may further include a power switch, a parameter input switch, etc., for operations other than the shutter operation.

The network I/F 1H14, the radio I/F 1H15, and the antenna 1H16 are devices, peripheral circuits, or the like that provide wireless or wired connection between the imaging device 1 and another computer via a network. For example, the imaging device 1 is connected to a network via the network I/F 1H14, and transmits data to the image processing apparatus 2. Here, the network I/F 1H14, the radio I/F 1H15, and the antenna 1H16 may provide a connection using, for example, a connector (not shown), such as a USB connector, or a cable (not shown).

The bus 1H17 is used to input and output data between the elements of the imaging device 1. The bus 1H17 is a so-called "internal bus". The bus 1H17 may be, for example, a Peripheral Component Interconnect Bus Express (PCI Express). The bus 1H17 may be based on the PCI or Industry Standard Architecture (ISA).

Note that the number of the imaging elements of the imaging device 1 is not limited to two. For example, three or more imaging elements may be included. Further, the imaging device 1 may generate (image) multiple partial images by changing an imaging angle of a single imaging element. Further, the optical system of the imaging device 1 is not limited to a system using the fisheye lens. For example, a wide-angle lens may alternatively be used.

Further, the processes to be performed by the imaging device 1 are not always performed by the imaging device 1. Namely, for example, a part or all the processes to be performed by the imaging device 1 may be performed by the image processing apparatus 2 or another computer (not shown) by transmitting data and parameters from the imaging device 1.

Image Processing Apparatus

The image generation apparatus may be, for example, the image processing apparatus 2. In the following, as an example of the image generation apparatus, the image processing apparatus 2 is described.

The image processing apparatus 2 may be, for example, a smartphone. Further, the image processing apparatus 2 refers to a computer and may be, for example, a personal computer (PC), a Personal Digital Assistance (PDA), a tablet, a cellular phone, etc.

Hardware configuration of the Image Processing Apparatus

Figure 6:
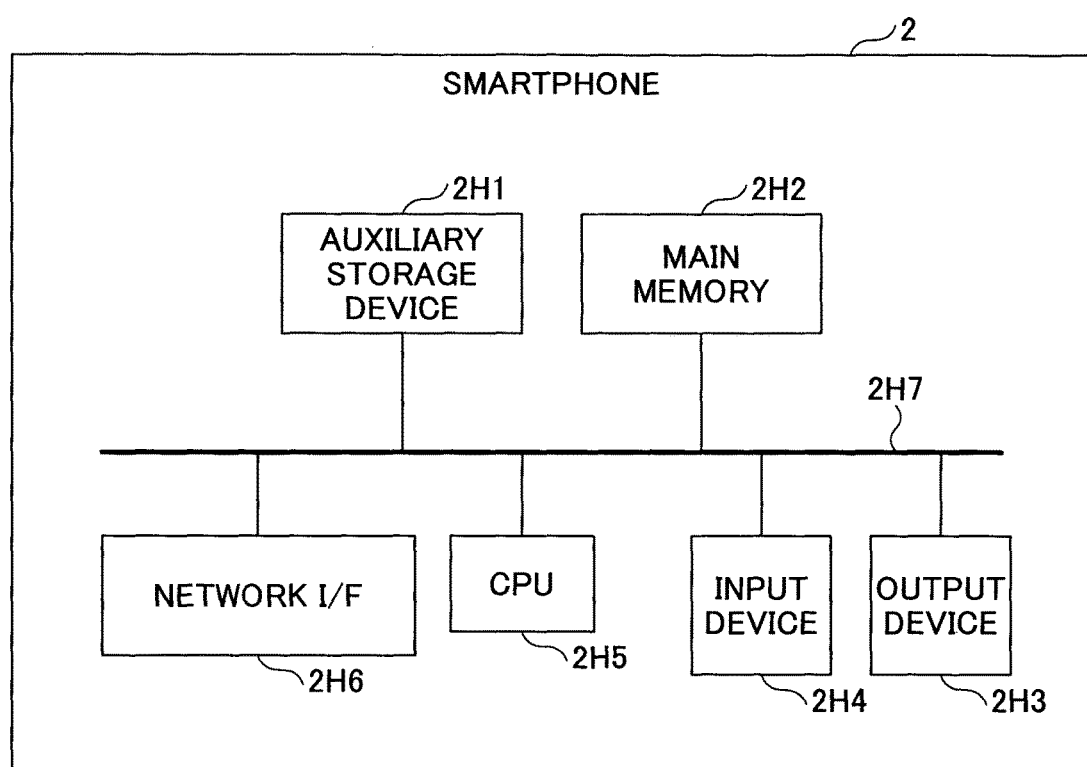
FIG. 6 is a block diagram of an example hardware configuration of an image processing apparatus according to an embodiment of the present invention.

FIG. 6 is a block diagram of an example hardware configuration of the image processing apparatus according to an embodiment of the present invention.

The image processing apparatus 2 includes an auxiliary storage device 2H1, a main memory 2H2, an output device 2H3, an input device 2H4, a CPU 2H5, and a network I/F 2H6. Those elements of the image processing apparatus 2 are connected to each other via a bus 2H7, so as to input and output data or signals.

The auxiliary storage device 2H1 stores information such as various data, which include intermediate results of the processes performed by the CPU 2H5 under the control of the CPU 2H5 and a control device (not shown), parameters, programs, programs and the like. The auxiliary storage device 2H1 may be, for example, a hard disk, a flash Solid State Drive (SSD), etc. A part or all of the information stored in the auxiliary storage device 2H1 may alternatively be stored in, for example, a file server (not shown) and the like connected via the network I/F 2H6.

The main memory 2H2 is a main memory that is a storage area such as a so-called "memory" used by a program executed by the CPU 2H5. The main memory 2H2 stores information such as data, programs, parameters, etc. The main memory 2H2 may be, for example, a Static Random Access Memory (SRAM), a DRAM, etc. The main memory 2H2 may include a control device (not shown) for storing and reading data into and from the memory part of the main memory 2H2.

The output device 2H3 is a device for display such as a display, a peripheral circuit, a driver, etc. The output device 2H3 displays an image on which image processing is performed.

The input device 2H4 is a device for operating an input Graphical User Interface (GUI) such as, for example, a so-called "touch panel" integrated with the output device 2H3, a peripheral circuit, a driver, etc. The output device 2H3 and the input device 2H4 may be provided, for example, as the display and a keyboard, respectively, in a separate manner. Further, the output device 2H3 and the input device 2H4 may be external devices connected to connectors (not shown) of the image processing apparatus 2 via cables (not shown), etc.

The CPU 2H5 performs calculations and control for the processes of the image processing apparatus 2. For example, the CPU 2H5 executes various programs. In order to achieve higher speed by parallel processing, the CPU 1H9 may include multiple CPUs, devices, or multiple cores. Further, an additional hardware resource (not shown) may be provided inside or outside of the imaging device 1, so that a part or all of the processes of the image processing apparatus 2 may be performed by the additional hardware resource.

The network I/F 2H6 is a device such as an antenna, a peripheral circuit, a driver, etc., for wireless or wired connection with another computer via a network. For example, the image processing apparatus 2 performs a process to input image data from the imaging device 1 by using the CPU 2H5 and the network I/F 2H6. Further, the image processing apparatus 2 performs a process to output predetermined parameters, etc., to the imaging device 1 by using the CPU 2H5 and the network I/F 2H6.

Functions of the Imaging System

Figure 7:
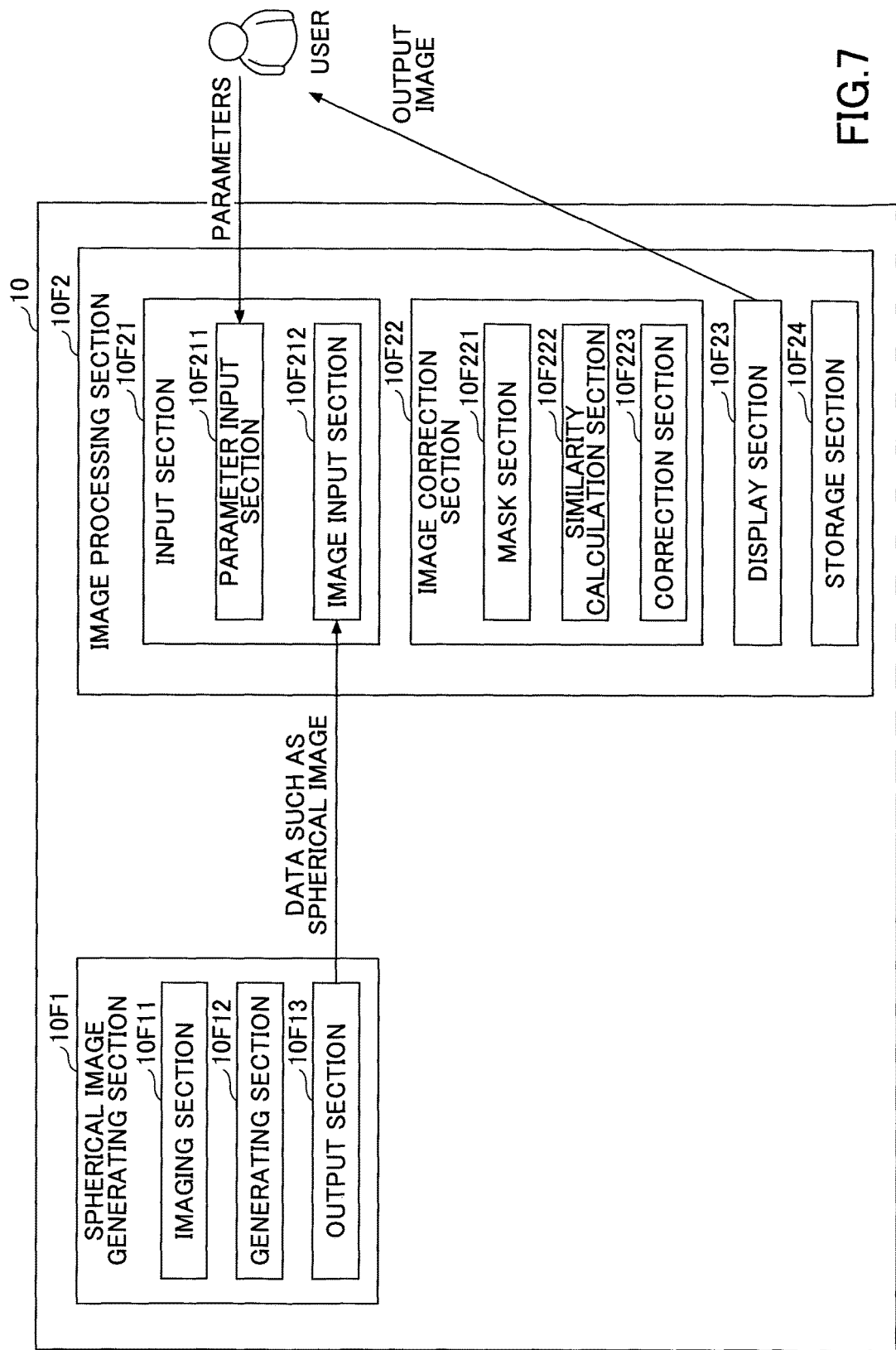
FIG. 7 is a functional block diagram of an example functional configuration of the imaging system according to an embodiment of the present invention.

FIG. 7 is a functional block diagram of an example functional configuration of the imaging system according to an embodiment of the present invention.

The imaging system 10 includes a spherical image generating section 10F1 and an image processing section 10F2.

The spherical image generating section 10F1 performs a process of generating a spherical image based on, for example, the images that are formed by the imaging device 1.

Further, the image processing section 10F2 performs a process of displaying an image that is processed based on the spherical image by, for example, the image processing apparatus 2 described below.

The spherical image generating section 10F1 includes an imaging section 10F11 and a generating section 10F12, and an output section 10F13.

The imaging section 10F11 performs a process of generating the hemispherical images by the imaging device 1. The imaging section 10F11 may perform preprocessing described below on the hemispherical image.

The generating section 10F12 performs a process of generating the spherical image described below based on the hemispherical images generated by the imaging section 10F11.

The output section 10F13 performs outputting, for example, the spherical image, which is generated by the generating section 10F12 of the imaging device 1, to the image processing apparatus 2.

When outputting an image, the output section 10F13 may perform a process of, for example, converting the format of the image so that a process in a latter part can be performed on the output image in the converted format.

The image processing section 10F2 includes an input section 10F21, an image correction section 10F22, a display section 10F23, and a storage section 10F24.

The input section 10F21 includes a parameter input section 10F211 and an image input section 10F212.

The parameter input section 10F211 performs a process of inputting parameters necessary for image correction described below from a user by the image processing apparatus 2. The parameters to be input include, for example, an output range parameter to designate an output range, a correction parameter to designate a correction part to be corrected in the output image, etc.

The image input section 10F212 performs a process of inputting data such as the spherical image from the imaging device 1 by the image processing apparatus 2.

When inputting the parameters and images, the input section 10F21 may perform a process of converting the format of the input data so that a process in a latter part can be performed on the data in the converted format.

The image correction section 10F22 performs a process of correcting, for example, the spherical image described below by using the data and the parameters that are input to the input section 10F21.

The image correction section 10F22 includes a mask section 10F221, a similarity calculation section 10F222, and a correction section 10F223.

The mask section 10F221 performs a process which relates to mask data described below, such as a mask data generating process described below.

The similarity calculation section 10F222 performs a process, which is based on similarity, such as a process of calculating the similarity described below.

The image correction section 10F223 performs a process of correcting the output image based on the mask data and the similarity which are described blow.

The display section 10F23 performs a process of displaying, for example, an image processed by the image correction section 10F22 of the image processing apparatus 2.

The storage section 10F24 stores image data generated by using a process described below by the image processing apparatus 2.

Note that the functions (configuration) of the present invention are not limited to the functions of FIG. 7. For example, the function that is performed by the spherical image generating section 10F1 may be included in the image processing section 10F2. Further the processes that are performed in the functions are not limited to the configuration that is provided (processed) by the hardware described above. For example, a part or all of the processes performed by the spherical image generating section 10F1 may be performed by the image processing apparatus 2 or another computer (not shown) connected via a network.

Overall Process by the Imaging System

FIG. 8 is a flowchart illustrating an example overall process by the imaging system according to an embodiment of the present invention.

In step S0801, the spherical image generating section 10F1 performs a process of generating the spherical image described below.

In step S0802, the spherical image generating section 10F1 performs a process of outputting the spherical image that is generated in step S0801 to the image processing section 10F2.

In step S0803, the image processing section 10F2 performs image processing described below on the spherical image that is input in step S0802.

In step S0804, the image processing section 10F2 performs a process of displaying the image that is image processed in step S0803 for user.

Process for Generating Spherical Image

FIG. 9 is a flowchart illustrating an example process of generating the spherical image according to an embodiment of the present invention. The spherical image may be generated by, for example, the spherical image generating section 10F1. The process of generating the spherical image in FIG. 9 corresponds to the process in step S0801 in FIG. 8.

In step S0901, the spherical image generating section 10F1 generates the images of FIGS. 4A and 4B by imaging.

In step S0902, the spherical image generating section 10F1 performs preprocessing described below on the hemispherical images that are generated in step S0901.

In step S0903, the spherical image generating section 10F1 performs a combine process described below to combine the hemispherical images on which the preprocessing is performed in step S0902. By performing the combine process, the spherical image generating section 10F1 generates the spherical image.

FIGS. 10A through 10D illustrate an example process of generating the spherical image according to an embodiment of the present invention.

Figure 10A:
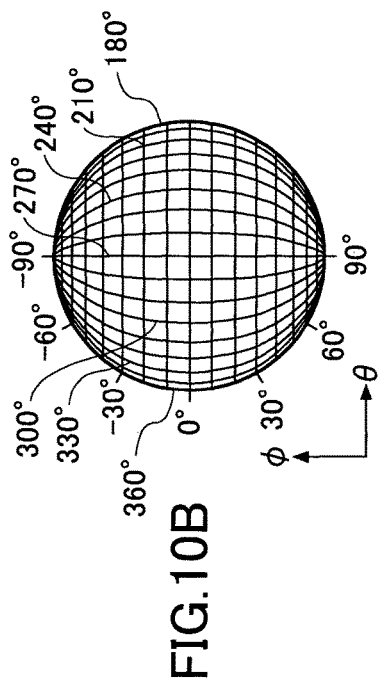
FIGS. 10A through 10D are drawings illustrating an example process of generating a spherical image according to an embodiment of the present invention.

FIG. 10A is a drawing illustrating the hemispherical image of FIG. 4A in a manner that the points having the same incident angle in the horizontal direction and the points having the same incident angle in the vertical direction relative to the optical axis are connected with lines. In the following a symbol "$\theta$" refers to the incident angle in the horizontal direction relative to the optical axis, and a symbol "$\varphi$" refers to the incident angle in the vertical direction relative to the optical axis.

Figure 10D:
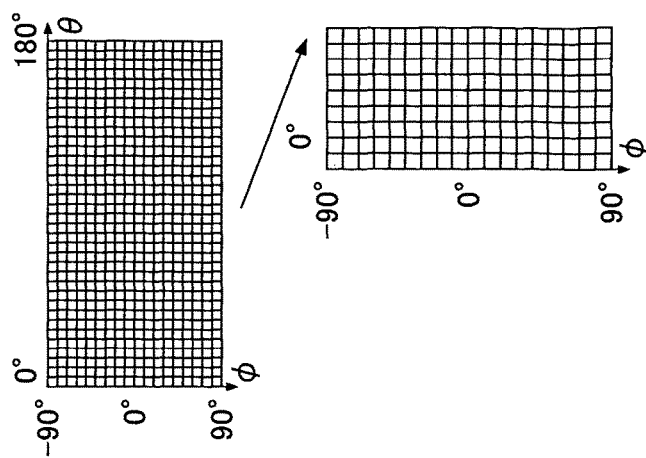
Figure 10B:
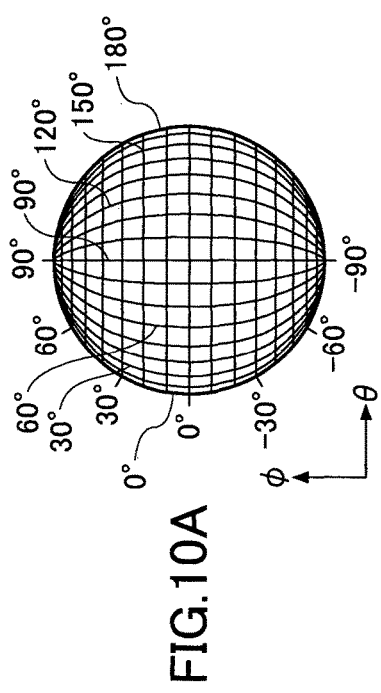

Similar to FIG. 10A, FIG. 10B is a drawing illustrating the hemispherical image of FIG. 4B in a manner that the points having the same incident angle in the horizontal direction and the points having the same incident angle in the vertical direction relative to the optical axis are connected with lines. The "preprocessing" in step S0902 refers to a process of, for example, converting the images of FIGS. 10A and 10B into an image as illustrated in FIG. 10C described below by the Mercator projection.

Figure 10C:
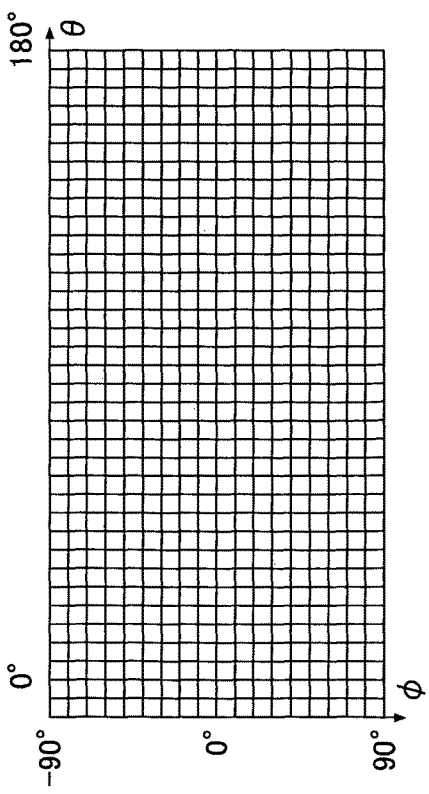

FIG. 10C is a drawing illustrating an example image on which a process of the Mercator projection has been performed. FIG. 10C is a drawing illustrating an example image on which the process of the Mercator projection has been performed after, for example, the image in a state of FIG. 10A is associated with a LookUpTable (LUT) prepared in advance.

FIG. 10D illustrates an example combine process performed in step S0903 of FIG. 9.

As illustrated in FIG. 10D, in the combine process, an image is generated by, for example, using plural images in a state of FIG. 10C. FIG. 10D illustrates an example where the combine process is performed on the images in states of FIGS. 10A and 10B by using an image on which the preprocessing is performed in step S0902 of FIG. 9. Here, the combine process is not limited to a process in which the images on which the preprocessing has been performed are just sequentially arranged. For example, when the center of the spherical image in the horizontal direction does not correspond to the position where $\theta=180°$, in the combine process, the image generated by performing the preprocessing on the image of FIG. 4A is disposed at the center part of the spherical image and, on the left and right sides thereof, the image generated by performing the preprocessing on the image of FIG. 4B is divided and disposed. Then, those images are combined by the combine process so as to generate the spherical image illustrated in FIG. 4C.

Note that the "preprocessing" is not limited to the process using the Mercator projection. For example, the pixel arrangement in "$\varphi$" direction in FIG. 10B is vertically inverted from that in FIG. 10A, and the pixel arrangement in "$\theta$" direction in FIG. 10B is horizontally inverted from that in FIG. 10A (i.e., a vertically/horizontally inverted image). In this case, the preprocessing may include a process of 180° rolling so that the pixel arrangement in "$\theta$" and "$\varphi$" directions in FIG. 10B are similar to those in FIG. 10A.

Further, the preprocessing may include a correction process of correcting the distortions in the images in states of FIGS. 10A and 10B. Further, the preprocessing may include a process for improving the image quality such as, for example, a shading correction process, a gamma-correction process, a white balance process, a camera shake correction (blurring correction) process, an optical black correction process, a defective pixel correction process, an edge emphasis process, a liner correction process or the like.

Further, for example, in the combine process, when there is an overlapped area in a shooting range between one hemispherical image and the other hemispherical image, a correction may be made by using the overlapped area to perform a highly accurate combine process.

Based on the process of generating the spherical image, the spherical image can be generated based on the hemispherical images.

Process by the image processing apparatus FIG. 11 is a flowchart illustrating an example process by the image processing apparatus according to an embodiment of the present invention. The process by the image processing apparatus in FIG. 11 corresponds to the process in step S0803 of FIG. 8.

In step S1101, the image processing section 10F2 performs a process of inputting the spherical image. The spherical image to be input in step S1101 is the spherical image that is output in step S0802 of FIG. 8. The spherical image is an image as illustrated in FIG. 4C. In the following, a case is described where the spherical image is the image as illustrated in FIG. 4C.

In step S1102, the image processing section 10F2 performs a process of inputting projection direction designation data described below.

Figure 12:
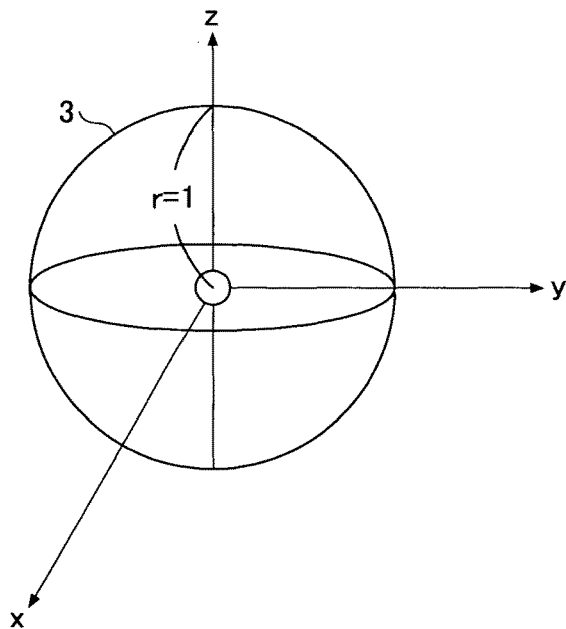
FIG. 12 is a drawing illustrating the spherical image in a three-dimensional coordinate system according to an embodiment of the present invention.

FIG. 12 is a drawing illustrating an example where the spherical image according to an embodiment is illustrated in a three-dimensional coordinate system.

The spherical image is an image that is generated by omnidirectional imaging as illustrated with reference to FIG. 3. Due to this, the spherical image can be illustrated as a sphere (globe) in a three-dimensional expression of the spherical image in a three-dimensional space. Here, it is assumed that r=1, where a symbol "r" refers to the radius of the sphere in a three-dimensional expression of the spherical image. The sphere in a three-dimensional expression of the spherical image is an inscribed sphere which inscribes a projection surface described below (hereinafter simplified as "inscribed sphere"). Here, it is assumed that the origin of the coordinate system of the three-dimensional expression of the spherical image is the position where the images are generated (imaged) (i.e., the location of the user, the location of the imaging device 1).

The projection direction designation data refers to the data indicating the coordinates of the pixel that is the center of the output image.

Figure 13:
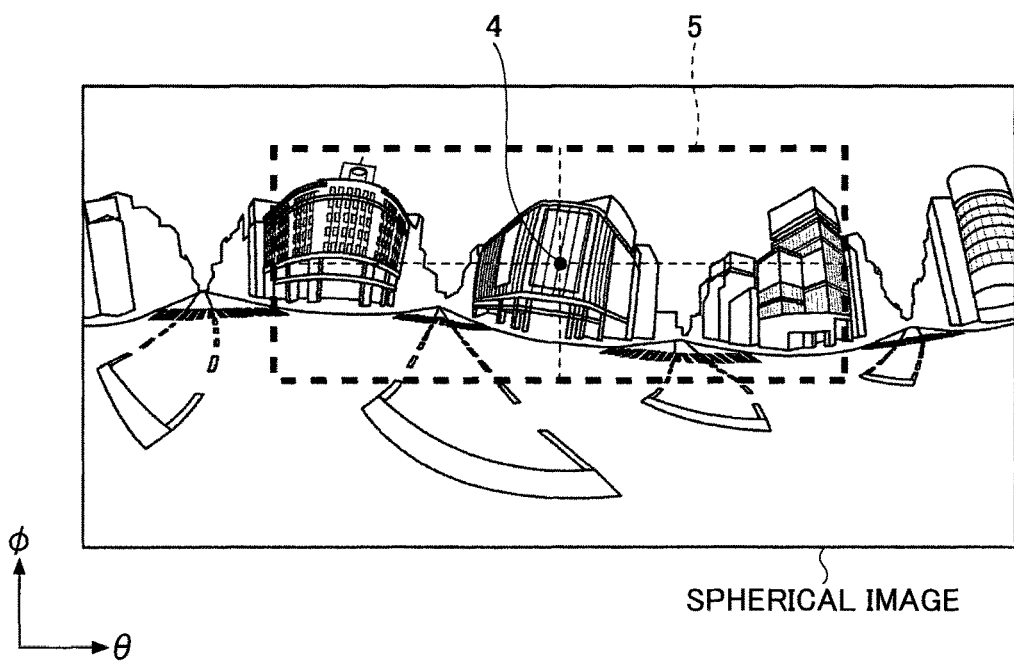
FIG. 13 is a drawing illustrating an example projection direction designation data according to an embodiment of the present invention.

FIG. 13 is a drawing illustrating an example of the projection direction designation data according to an embodiment of the present invention.

The projection direction designation data are the data to indicate the center coordinates 4. The projection direction designation data are expressed using, for example, the (θ,φ) coordinate system similar to that for the spherical image.

The output range refers to data indicating a range of the output image. The output range 5 is determined based on the center coordinates 4. For example, the length in the θ direction and the length in the φ direction of the output range 5 are determined based on the predetermined number of pixels by regarding the center coordinates 4 as the center.

The projection direction designation data are generated by, for example, displaying the spherical image on the output device 2H3 of the image processing apparatus 2, so that a user inputs the coordinates of the projection direction designation data to the input device 2H4 of the image processing apparatus 2.

In step S1103, the image processing section 10F2 performs a process of calculating the projection surface based on the projection direction designation data.

Figure 14B:
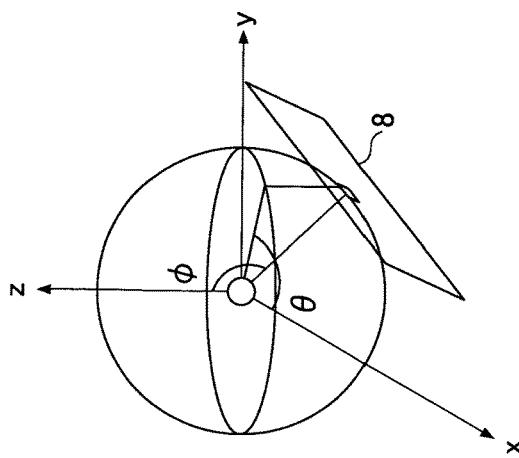
FIGS. 14A and 14B are drawings illustrating an example process of calculating a projection surface according to an embodiment of the present invention.
Figure 14A:
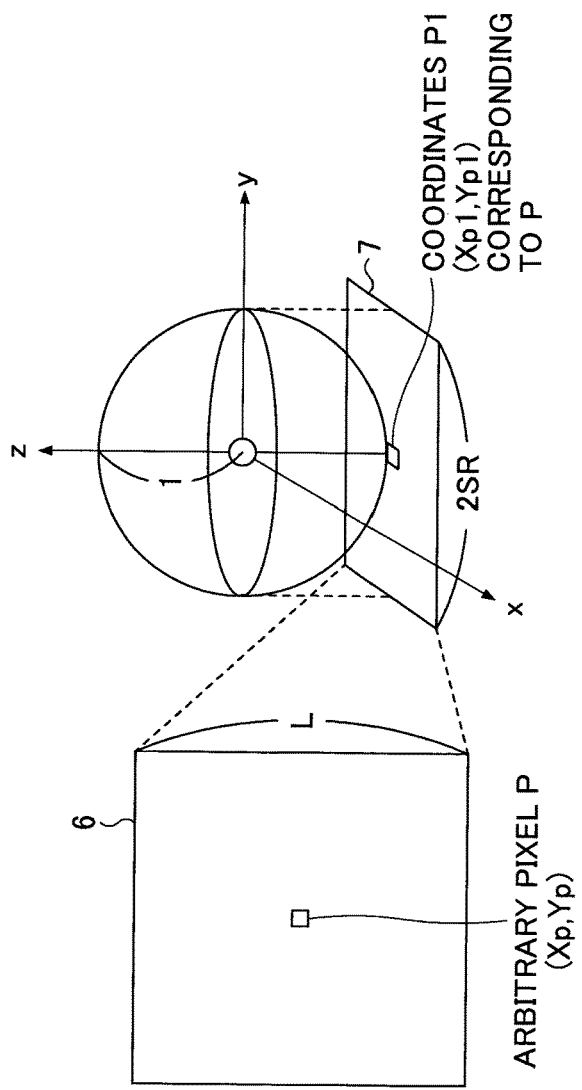

FIGS. 14A and 14B are drawings illustrating an example process of calculating the projection surface according to an embodiment of the present invention.

Here, a case is described where the number of pixels of one side of an output image 6 is L.

In the coordinate system as illustrated in FIG. 12, the output image 6 can be expressed as a projection surface 7 whose length of one side is 2SR. When the coordinates of an arbitrary pixel point P on the output image 6 are given as (Xp,Yp), the corresponding coordinates P1 (Xp1,Yp1) on the projection surface 7 are expressed as the following Formula 1.

$$Xp1 = SR \cdot (L - 2 \cdot Xp)/L$$

$$Yp1 = SR \cdot (L - 2 \cdot Yp)/L \quad \text{Formula 1}$$

When the projection surface 7 is in contact with the sphere having the radius of 1 (r=1) as illustrated in FIG. 14A, the coordinates of P1 in the three-dimensional coordinate system are (Xp1, Yp1,−1). The projection surface 7 is inscribed by the inscribed sphere 3.

By rotating the projection surface 7 around the X axis and the Z axis, the projection surface 7 can be set at an arbitrary position while contacting the sphere having radius of 1 (r=1).

When the projection surface 7 is rotated around the X axis by φ and around the Z axis by θ, the conversion of the coordinates around the X axis is calculated by the rotation matrix of the following Formula 2, and the conversion of the coordinates around the Z axis is calculated by the rotation matrix of the following Formula 3. In Formulas 2 and 3, it is assumed that "(x,y,z)" denotes the coordinates before rotation, and "(X,Y,Z)" denotes the coordinates after the rotation.

$$\begin{bmatrix} X \\ Y \\ Z \end{bmatrix} = \begin{bmatrix} 1 & 0 & 0 \\ 0 & \cos\phi & -\sin\phi \\ 0 & \sin\phi & \cos\phi \end{bmatrix} \begin{bmatrix} x \\ y \\ z \end{bmatrix} \quad \text{Formula 2}$$

$$\begin{bmatrix} X \\ Y \\ Z \end{bmatrix} = \begin{bmatrix} \cos\theta & -\sin\theta & 0 \\ \sin\theta & \cos\theta & 0 \\ 0 & 0 & 1 \end{bmatrix} \begin{bmatrix} x \\ y \\ z \end{bmatrix} \quad \text{Formula 3}$$

When the projection surface 7 is rotated around the X axis and the Z axis based on Formulas 2 and 3, respectively, the coordinates of the rotated projection surface 8 can be calculated based on the rotation matrix R of the following Formula 4. In Formula 4, it is assumed that "(xd,yd,zd)" denotes the coordinates before the rotation, and "(Xd,Yd,Zd)" denotes the coordinates of the rotated projection surface 8 after the rotation. The rotated projection surface 8 is inscribed by the inscribed sphere 3.

$$\begin{bmatrix} Xd \\ Yd \\ Zd \end{bmatrix} = \begin{bmatrix} \cos\theta & -\sin\theta & 0 \\ \sin\theta & \cos\theta & 0 \\ 0 & 0 & 1 \end{bmatrix} \begin{bmatrix} 1 & 0 & 0 \\ 0 & \cos\phi & -\sin\phi \\ 0 & \sin\phi & \cos\phi \end{bmatrix} \begin{bmatrix} xd \\ yd \\ zd \end{bmatrix} \quad \text{Formula 4}$$

$$= \begin{bmatrix} \cos\theta & -\sin\theta\cos\phi & \sin\theta\sin\phi \\ \sin\theta & \cos\theta\cos\phi & -\cos\theta\sin\phi \\ 0 & \sin\phi & \cos\phi \end{bmatrix} \begin{bmatrix} xd \\ yd \\ zd \end{bmatrix}$$

$$= R \cdot \begin{bmatrix} xd \\ yd \\ zd \end{bmatrix}$$

The image processing section 10F2 rotates the projection surface 7 based on Formula 4, so as to calculate that the rotated projection surface 8 corresponds to the position indicated by the projection direction designation data.

Note that the calculation for the rotation is not limited to the calculation based on Formula 4. For example, a calculation method using a Rodorigues' rotation formula or an Euler's angle may alternatively be used.

In step S1104, the image processing section 10F2 performs a process of converting the three-dimensional coordinates on the projection surface into the polar coordinates on the spherical image.

Figure 15:
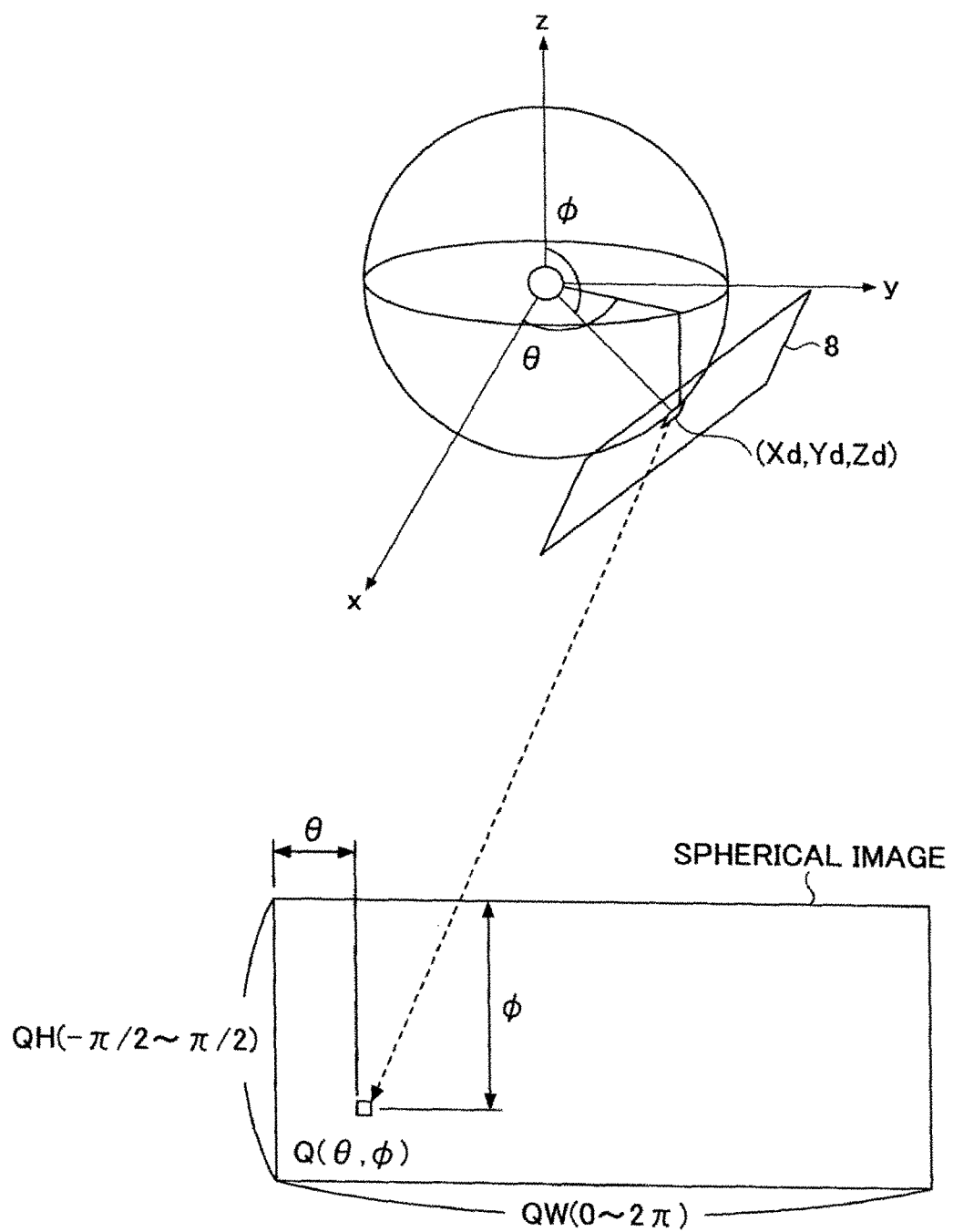
FIG. 15 is a drawing illustrating an example process of converting three-dimensional coordinates on the projection surface into polar coordinates on the spherical image according to an embodiment.

FIG. 15 illustrates an example process of converting the three-dimensional coordinates on the projection surface into the polar coordinates on the spherical image according to an embodiment of the present invention.

The coordinates on the rotated projection surface 8 that has been rotated based on the calculation in step S1103 are (Xd,Yd,Zd) in the three-dimensional coordinates as illustrated in Formula 4 and FIG. 14B. While the coordinates on the rotated projection surface 8 are based on the three three-dimensional coordinates, the coordinates on the spherical image are given as (θ,φ) which are based on the polar coordinates of FIGS. 10A through 10D. As illustrated in FIG. 15, in step S1104, the image processing section 10F2 calculates the polar coordinates (θ,φ) on the spherical image, which correspond to the coordinates (Xd,Yd,Zd) on the rotated projection surface 8, based on the following Formula 5.

$$\theta = \arctan\left(\frac{Yd}{\sqrt{Xd^2 + Yd^2 + Zd^2}}\right)$$

OR $$\theta = \arctan\left(\frac{Xd}{\sqrt{Xd^2 + Yd^2 + Zd^2}}\right)$$

$$\phi = \arcsin\left(\frac{Zd}{\sqrt{Xd^2 + Yd^2 + Zd^2}}\right)$$

Formula 5

In step S1105, the image processing section 10F2 performs a process of calculating all the coordinates' values on the spherical image corresponding to the polar coordinates on the spherical image. The image processing section 10F2 calculates the coordinates Q (Xq,Yq) on the spherical image corresponding to the polar coordinates (θ,φ) on the spherical image, which are calculated in step S1104, based on the following Formula 6.

$$Xq = \frac{\theta \cdot QW}{2\pi}$$

$$Yq = QH \cdot 0.5 - \frac{\phi \cdot QH}{\pi}$$

Formula 6

In Formula 6, the symbol "QW" denotes a length in the θ direction of the spherical image, the symbol "QH" denotes a length in the φ direction of the spherical image, and "Π" denotes the ratio of the circumference of a circle to its diameter. The unit of the angle herein is radian ("rad").

In step S1106, the image processing section 10F2 performs a process of generating the pixels of the output image.

FIGS. 16A through 16D illustrate an example process of generating the pixels of the output image according to an embodiment of the present invention.

FIG. 16A illustrate an example where the coordinates Q (Xq,Yq), which are calculated in step S1105, are indicated on the spherical image.

FIG. 16B is an enlarged view of the area in the vicinity of the coordinates Q (Xq,Yq) in FIG. 16A.

The process of generating the pixels of the output image refers to a process of calculating the pixel value of the pixel corresponding to the coordinates Q based on, for example, the coordinates Q (Xq,Yq) and the peripheral pixels near the coordinates indicated by the coordinates Q (Xq,Yq). The process of generating the pixels of the output image refers to, for example, an interpolation process based on peripheral four pixels of the coordinates indicated by the coordinates Q (Xq,Yq)(so-called "Bi-linear interpolation"), etc.

The Bi-linear interpolation is the calculation based on, for example, the values under decimal points of the coordinates Q (Xq,Yq) and the brightness values of the peripheral four pixels of the coordinates indicated by the coordinates Q (Xq,Yq).

The calculation is described by assuming that "Dij" denotes the pixel value of the pixel corresponding to the coordinates Q (Xq,Yq), "P00, P10, P01, and P11" denote the peripheral four pixels, and "D00, D10, D01, and D11" denote the brightness values of the peripheral four pixels "P00, P10, P01, and P11", respectively.

FIG. 16C illustrates an example of the Bi-linear interpolation.

For example, the pixel value "Dij" can be calculated based on the following Formula 7.

$$Dij=(1-\alpha)\cdot(1-\beta)\cdot D00+\alpha\cdot(1-\beta)\cdot D10+(1-\alpha)\cdot\beta\cdot D01+\alpha\cdot\beta\cdot D11$$

Formula 7

Where, "α" and "β" denote the values under decimal points of the coordinates Q (Xq,Yq), respectively.

In the process of generating the pixels of the output image, the calculation for the process is based on the brightness values of the peripheral four pixels. Therefore, it becomes possible to naturally restore and generate an image having a high quality.

Note that the process of generating the pixels of the output image is not limited to the Bi-linear interpolation in Formula 7. For example, to make the process easier, a process of Nearest-neighbor interpolation may be used. Further, to acquire higher-quality image, a process of Bi-cubic convolution may be used.

The processes in steps S1104 through S1106 are repeated for all pixels of the output data, so as to generate the pixels of the output image as illustrated in FIG. 16D.

In step S1107, the image correction section 10F22 performs a mask data generating process.

In the mask data generating process, a correction area, which is a target of an image correction process in the output image, is determined by a user's designation, and data to identify the pixels of the correction area are generated.

FIGS. 17A through 17C are drawings illustrating an example mask data generating process according to an embodiment of the present invention.

In the mask data generating process, for example, the display section 10F23 outputs (displays) the output image 6 to a user, so that the user designates an area where the user determines that correction is necessary.

In the following, a case is described where the output image 6 includes a first object to be imaged 61 and a second object to be imaged 62 and a user determines that it is necessary to correct the area of the first object to be imaged 61.

FIG. 17A illustrates an example output image before the user's designation. A user checks the output image 6 of FIG.

17A, so that the user can determine that it is necessary (desired) to correct the area of the first object to be imaged 61.

For example, the user designates the area by using the input section 10F21 of FIG. 7. The designation refers to, for example, a process of inputting the pixels corresponding to the area of the first object to be imaged 61 as illustrated in FIG. 17B. Further, the designation may refer to, for example, a process of inputting an area including the pixels corresponding to the area of the first object to be imaged 61 as illustrated in FIG. 17C. Further, the designation may refer to, for example, a process of prompting a user to input any of the pixels corresponding to the area of the first object to be imaged 61 in FIG. 17A. After the input by the user, the image processing apparatus 2 calculates pixels that are near the input pixel and can be determined to have similar characteristics as the input pixel has such as the same or equivalent brightness value, so that the calculated plural pixels can be regarded as the designated area.

The mask data refer to the data indicating the coordinates in the designated area.

The image processing apparatus 2 may generate an output image in which the coordinates indicated by the mask data are colored with a predetermined color, and outputs the output image to the user.

In step S1108, the image correction section 10F22 performs a process based on similarity.

Process Based on Similarity

Figure 18:
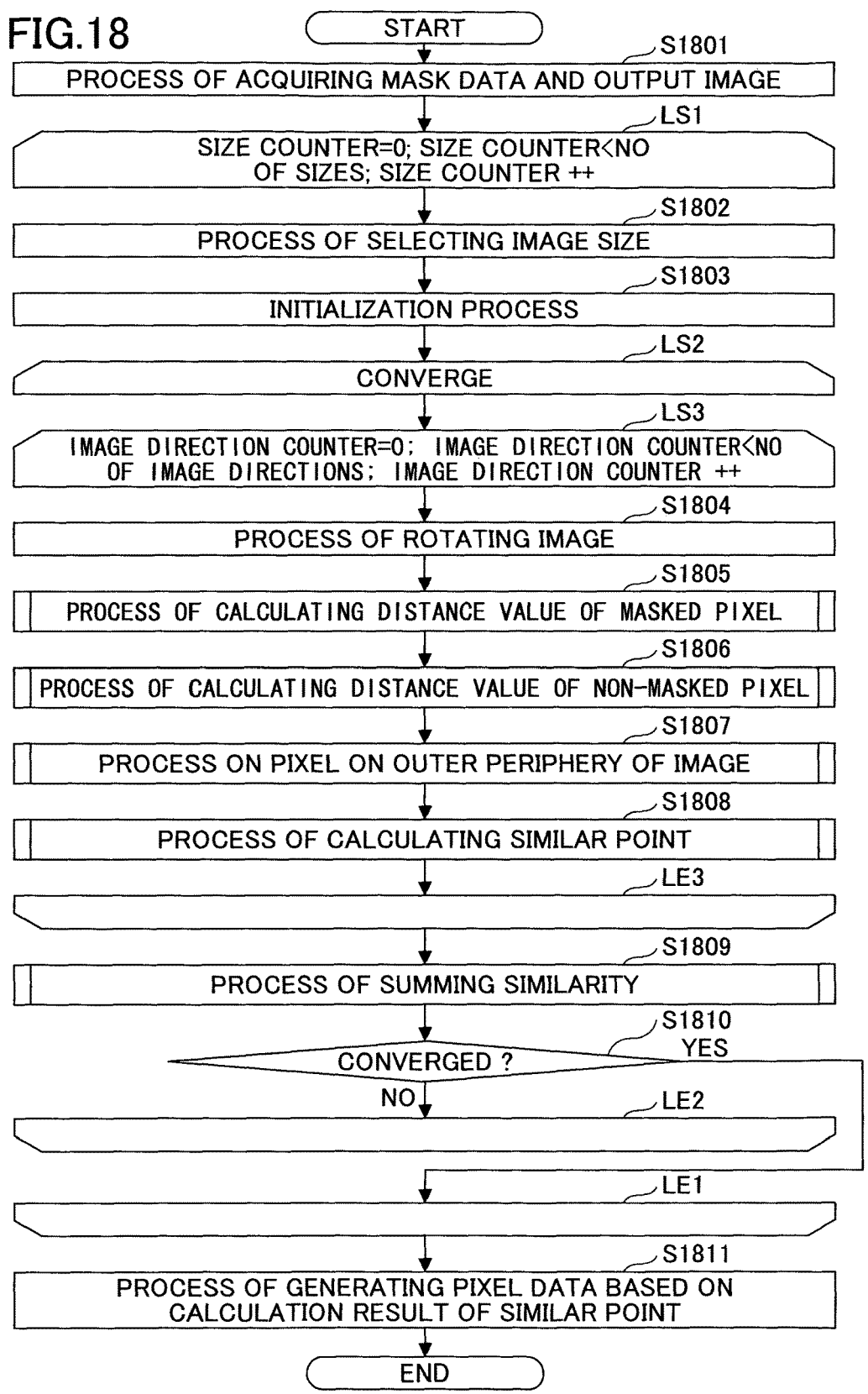
FIG. 18 is a flowchart illustrating an example process based on similarity according to an embodiment of the present invention.

FIG. 18 is a flowchart illustrating an example process based on similarity according to an embodiment of the present invention.

FIGS. 19A through 19H are drawings illustrating an example process based on the similarity according to an embodiment of the present invention.

The process of FIGS. 18 and 19A through 19H correspond to the process in step S1108 of FIG. 11.

FIG. 18 illustrates a size of an image when, for example, the number of the pixels in the horizontal direction of the output image is 2048 and the number of the pixels in the vertical direction of the output image is 1024.

Herein, "1/1 image" refers to an image having 2048 pixels in the horizontal direction and 1024 pixels in the vertical direction.

Herein, "1/2 image" refers to an image having 1024 pixels in the horizontal direction and 512 pixels in the vertical direction, which are half of the number of the pixels in the horizontal direction and the vertical direction, respectively, of the "1/1 image".

Herein, "1/4 image" refers to an image having 512 pixels in the horizontal direction and 256 pixels in the vertical direction, which are one fourth of the number of the pixels in the horizontal direction and the vertical direction, respectively, of the "1/1 image".

Herein, "1/8 image" refers to an image having 256 pixels in the horizontal direction and 128 pixels in the vertical direction, which are one eighth of the number of the pixels in the horizontal direction and the vertical direction, respectively, of the "1/1 image".

Note that that the image is not limited to the image having 2048 pixels in the horizontal direction and 1024 pixels in the vertical direction. For example, the image may have 1024 pixels in the horizontal direction and 512 pixels in the vertical direction.

Further, note that the scaling factors of the image (image sizes) are not limited to "1/8 image", "1/4 image", "1/2 image", and "1/1 image". For example, "1/16 image", etc., may also be employed.

Further, note that the number of the scaling factors of the image is not limited to four. For example, the number of the scaling factors may be increased or reduced.

In step S1801, the image correction section 10F22 acquires the mask data, which are generated in step S1107 of FIG. 11, and the output image which is generated in step S1106 of FIG. 11.

In step S1802, the image correction section 10F22 performs a process of selecting the image size. The process of selecting the image size is performed based on, for example, a size counter. Specifically, for example, the image correction section 10F22 selects the "1/8 image" when the value of the size counter is zero and selects the "1/4 image" when the value of the size counter is one. Similarly, the image correction section 10F22 selects the "1/2 image" when the value of the size counter is two and selects the "1/1 image" when the value of the size counter is thee. Note that the selection order of the image sizes is not limited to the above order. For example, the image sizes may be selected from the "1/1 image".

The image correction section 10F22 repeats the processes from step S1802 based on the number of the image sizes. In FIG. 18, the beginning and ending of the repeat based on the number of the image sizes are expressed as "LS1" and "LE1", respectively. For example, when the image sizes are "1/8 image", "1/4 image", "1/2 image", and "1/1 image", the number of the image sizes is four. In this case, in the process repeated from LS1 to LE1, the values of the size counter are, for example, 0 to 3.

In step S1803, the image correction section 10F22 performs an initialization process. The initialization process refers to, for example, a process of generating initial value data in the mask data.

In the following, an example is described where a designation area 91 is input by a user as illustrated in FIG. 19A.

Mask data 9 are data so that the designation area 91 designates an area of the output image 6 to be corrected. The mask data 9 are data having the same number of pixels as the output image.

In an initial value setting, data are generated in which different values are set between the pixels which are not a target of the designation area 91 (hereinafter referred to as "non-masked pixels") and the pixels which are not a target of the designation area 91 ("masked pixels") based on the mask data 9. In FIGS. 19A through 19H, the non-masked pixels are illustrated as white cells, and the masked pixels are illustrated as colored cells (having hatched lines).

FIG. 19A illustrates a case where, for example, the image correction section 10F22 generates initial value data "+10000" (not shown) for the non-masked pixels of the mask data 9 and initial value data "−10000" (not shown) for the masked pixels of the mask data 9. Note that the initial values are not limited to "+10000" and "−10000". Any values may be used as the initial values as long as the masked pixels and the non-masked pixels can be distinguished from each other.

In step S1804, the image correction section 10F22 performs a rotation process on the image. For example, the rotation process of the image is performed based on a value of an image direction counter. Specifically, for example, when the value of the image direction counter is zero, the image correction section 10F22 sets the image in the same direction as that of the input image. When the value of the image direction counter is one, the image correction section 10F22 rotates the input image around a vertical axis so as to set (generate) the vertically-inverted image. When the value of the image direction counter is two, the image correction section 10F22 rotates the input image around a horizontal axis so as to set (generate) the horizontally-inverted image. When the value of the image direction counter is three, the image correction section 10F22 rotates the input image around a diagonal axis so as to set (generate) the diagonally-inverted image.

By changing the direction of the image by the rotation process, it becomes possible to appropriately calculate the similarity even when the image includes an abstract pattern including straight lines or curved lines (so called "geometric pattern") such as a radiation image. Note that the type of directions, the number of the types, the order are not limited to those in the above case. For example, the vertical inversion may be performed first in the order.

The processes from step S1804 are repeated based on the determination whether a similarity sum value described below has converged (in step S1810). The beginning and ending of the repeat based on the determination are expressed as "LS2" and "LE2", respectively.

In step S1805, the image correction section 10F22 performs a process of calculating a distance value of the masked pixels.

The process of calculating the distance value of the masked pixels refers to a process of counting the number of pixels corresponding the distance between each of the masked pixels and the corresponding non-masked pixel.

The process of calculating the distance value of the masked pixels may be based on a so-called "Raster Scan method" in which the process starts from the left-upper pixel of the image and ends at the right-lower pixel.

In step S1805, the image correction section 10F22 performs a process of finding (detecting) the masked pixel by the Raster Scan method. Since the value "−10000" is input into the masked pixel in the initial setting, the image correction section 10F22 determines whether the pixel is the masked pixel based on the input value.

FIGS. 19B and 19C illustrate an example process of calculating the distance value of the masked pixel.

In step S1805, the image correction section 10F22 performs the Raster Scan from left upper to right lower, and generates first mask pixel calculation data 92 by the process of calculating the distance value of the masked pixel. The absolute value of the value that is input to the first mask pixel calculation data 92 indicates the distance from the boundary line between the area of the masked pixels and the area of the non-masked pixels.

The process of generating the first mask pixel calculation data 92 can be described as illustrated in, for example, FIG. 19B. The process of generating the first mask pixel calculation data 92 is the process in which, when the pixel next to a target masked pixel on the upper side or the on the left side of the target masked pixel is the non-masked pixel, the value of the target masked pixel is set to "−1". The process of generating the first mask pixel calculation data 92 is the process in which, when both the pixels next to a target masked pixel on the upper side and on the left side of the target masked pixel are not the non-masked pixel, the value of the target masked pixel is set to a value which is calculated by subtracting "1" from the value of the pixel next to the target masked pixel on the upper side or on the left side of the target masked pixel, whichever is greater. The process of generating the first mask pixel calculation data 92 is the process in which the values of the pixels on the outer periphery of the image are maintained as the initial values.

Next, the image correction section 10F22 performs the Raster Scan on the first mask pixel calculation data 92 from right lower to right upper and calculates the similarity of the masked pixels, so as to generate second mask pixel calculation data 93.

The process of generating the second mask pixel calculation data 93 can be described as illustrated in, for example, FIG. 19C. The process of generating the first mask pixel calculation data 92 is the process in which, when the pixel next to a target masked pixel on the lower side or the on the right side of the target masked pixel is the non-masked pixel, the value of the target masked pixel is set to "−1". The process of generating the second mask pixel calculation data 93 is the process in which, when both the pixels next to a target masked pixel on the lower side and the on the right side of the target masked pixel are not the non-masked pixel, the value of the target masked pixel is set to a value which is calculated by subtracting "1" from the value of the pixel next to the target masked pixel on the lower side or on the right side of the target masked pixel, whichever is greater. The process of generating the second mask pixel calculation data 93 is the process in which the values of the pixels on the outer periphery of the image are maintained as the initial values.

In step S1806, the image correction section 10F22 performs a process of calculating the distance value of the non-masked pixels.

In step S1806, the image correction section 10F22 performs the Raster Scan on the mask data 9 from right upper to left lower and a process of calculating the distance value of the non-masked pixels, so as to generate third mask pixel calculation data 94. In the process of generating the third mask pixel calculation data 94, the following operation is repeated while a value of the variable step count is incremented from 1 to 10. Since the value "+10000" is input into the non-masked pixel in the initial setting, the image correction section 10F22 determines whether the pixel is the non-masked pixel based on the input value.

In the process of generating the third mask pixel calculation data 94, when any of the values of eight surrounding pixels of a target non-masked pixel is any of one through ten, the value of the target non-masked pixel is set to the value of the variable step count. In the process of generating the third mask pixel calculation data 94, when all the values of eight surrounding pixels of a target non-masked pixel are other than the values in a range from one to ten, the value of the target non-masked pixel is set to "+1".

FIG. 19D illustrates the mask data when a process is performed of calculating the distance value of the non-masked pixels when the value of the variable step count is "1".

FIG. 19E illustrates the mask data when a process is performed of calculating the distance value of the non-masked pixels when the value of the variable step count is "2".

FIG. 19F illustrates the mask data when a process is performed of calculating the distance value of the non-masked pixels when the value of the variable step count is "3".

Next, the image correction section 10F22 performs the processes until the value of the variable step count is "10". After that, the image correction section 10F22 performs a process on the masked pixel having the value of "+10000". The image correction section 10F22 performs a process of changing the value of the masked pixel from "+10000" to "+100". FIG. 19G illustrates a case where the process is performed on the masked pixel having the value of "+10000".

In step S1807, the image correction section 10F22 performs a process on the pixels on the outer periphery of the image. FIG. 19H illustrates an example where the process is performed on the pixels on the outer periphery of the image. The image correction section 10F22 performs a process of changing (setting) the values of the pixels on the outer periphery of the image to "+10000". This process is performed on the pixels on the outer periphery of the image regardless whether the pixel is the masked pixel or the non-masked pixel. In the process of calculating the distance value and the brightness value described above, the outer periphery of the image does not have (sufficient) peripheral pixels and they cannot be used in the calculation. Therefore, a value as an invalid flag value is input.

There are many cases where image quality of the non-masked pixel, which is referred to correct the masked pixel, can be improved by using nearby pixels. Up to step S1807, the image correction section 10F22 has performed a process of generating the mask data where a value based on the distance to the non-masked pixel is input to the masked pixel.

In step S1808, the image correction section 10F22 performs a process of calculating the similar point regarding the masked pixel and the non-masked pixel near the masked pixel.

For example, when an arbitrary pixel (hereinafter "first pixel") is determined, the similar point refers to a pixel (hereinafter "second pixel"), which is other than the first pixel, having the minimum similarity value relative to the first pixel.

The similarity is calculated based on the brightness values of the first pixel and the second pixel and the distance value. As the similarity value is decreased, it is determined that the first pixel is more similar to the second pixel. The brightness values of the first pixel and the second pixel may be based on, for example, an averaged brightness value of the pixels within four peripheral pixels, that is the averaged brightness value of the 9×9 pixels where the pixel of the calculation target is located at the center thereof. Note that the range of the average calculation of the brightness values is not limited to the range of 9×9 pixels. The range of 9×9 pixels may be changed in consideration of the calculation time, etc.

Further, the similarity may be obtained based on a Sum of Squared Difference (SSD) method or a Sum of Absolute Difference (SAD) method using a weighting based on the distance.

In step S1809, the image correction section 10F22 sums up the similarity values calculated in step S1808 for all the pixels to calculate the sum of the image (hereinafter referred to as a "sum value"). The sum value for each image is stored in the storage section 10F24. In the following, the sum value calculated in step S1809 is called a "current sum value". The sum value, which is calculated, for an image which is other than the image on which the "current sum value" stored in the storage section 10F24 is based, is called a "previous sum value" or a "before previous sum value".

In step S1810, the image correction section 10F22 determines whether the similarity sum value is converged based on the sum value calculated in step S1809 and the "before previous sum value" stored in the storage section 10F24.

Herein, it is determined that the similarity sum value has converged when both the conditions described in the following Formulas 8 and 9 are fulfilled. When it is determined that the sum value has converged (YES in step S1810), the processes for the corresponding size (i.e., the processes from LS1 to LE1) end. When it is determined that the sum value has not converged (NO in step S1810), the process goes back to the beginning "LS2" of the loop, so that the processes from step 1804 to step S1819 are performed. Here, the threshold values in the following Formulas 8 and 9 are arbitrary values that can be set by a user in advance. The "previous five sum value" herein refers to a sum value of the "current sum value", the "previous sum value", a "one time before the previous sum value", a "two times before the previous sum value", and a "three times before the previous sum value". The "previous five sum value from the previous sum value" herein refers to a sum value of the "previous sum value", the "one time before the previous sum value", the "two times before the previous sum value", the "three times before the previous sum value", and a "four times before the previous sum value".

$$\frac{\text{PREVIOUS FIVE SUM VALUE}}{\text{PREVIOUS FIVE SUM VALUE FROM PREVIOUS SUM VALUE}} \le \text{THRESHOLD VALUE} \quad \text{Formula 8}$$

$$\frac{|(\text{PREVIOUS SUM VALUE}) - (\text{CORRENT SUM VALUE})|}{\text{CORRENT SUM VALUE}} \le \text{THRESHOLD VALUE} \quad \text{Formula 9}$$

In step S1811, the image correction section 10F22 performs a process of calculating the brightness value of the masked pixel based on the similarity. The image correction section 10F22 calculates the brightness value corresponding to the similar point calculated in step S1808. For example, the calculation of the brightness value corresponding to the similar point is to calculate a value by averaging the brightness values of the pixels near the similar point, or to calculate a value based on a Bi-linear method.

Process to Reflect to the Spherical Image

In step S1109, the image correction section 10F22 performs a process to reflect to the spherical image.

Figure 20:
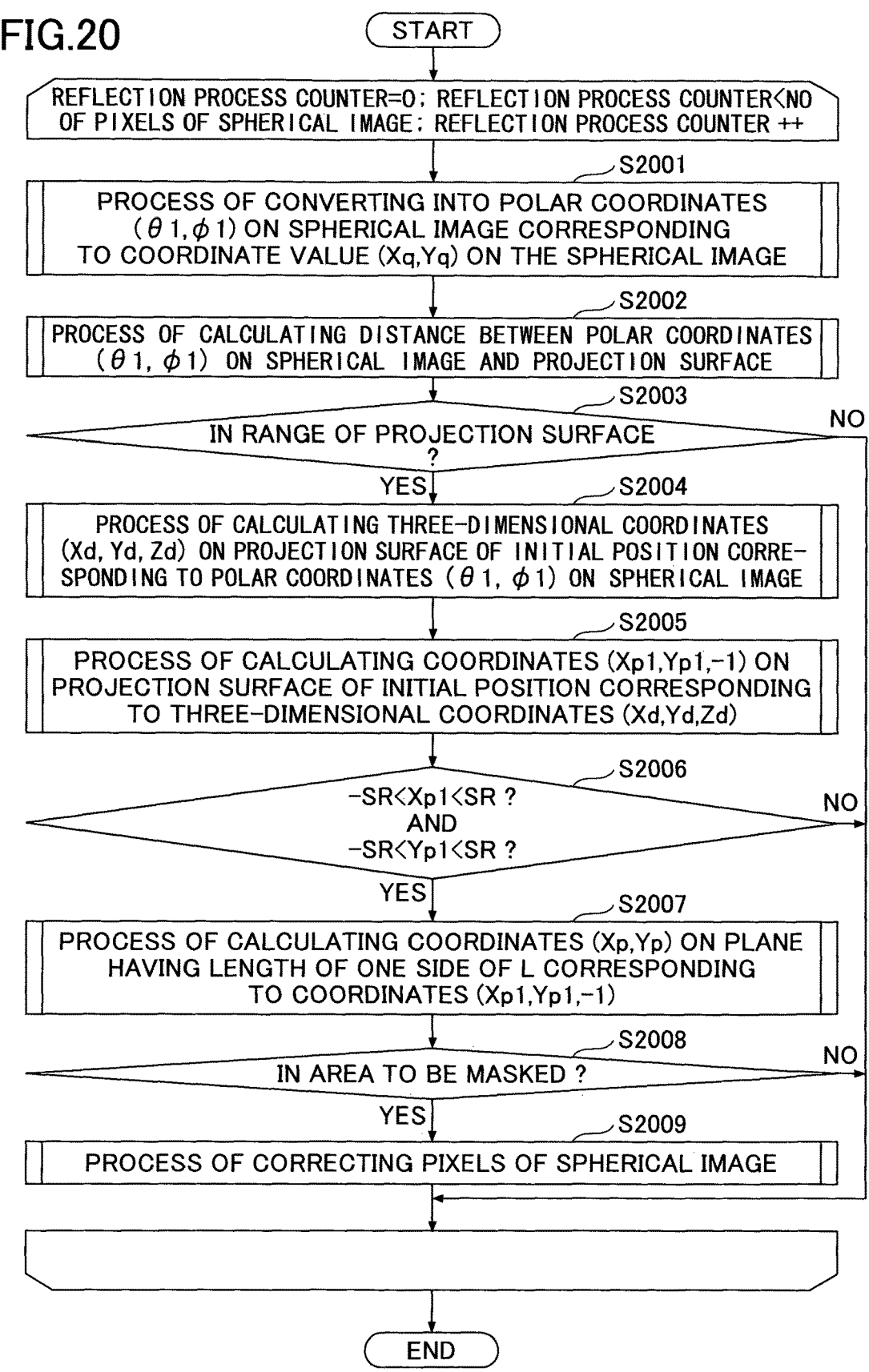
FIG. 20 is a flowchart illustrating an example reflecting process onto the spherical image according to an embodiment of the present invention.

FIG. 20 is a flowchart illustrating an example process to reflect to the spherical image according to an embodiment of the present invention.

FIGS. 21A through 21E are drawings illustrating an example process to reflect to the spherical image according to an embodiment of the present invention.

The process to reflect to the spherical image refers to a process, which is to reflect the process to the masked pixel that is corrected by the process based on the similarity described with reference to FIG. 18, to similarly reflect to the pixel corresponding to the masked pixel in the spherical image.

The processes in steps S2001 through S2009 are performed for all the pixels of the spherical image. The processes in steps S2001 through S2009 are performed by starting, for example, from the left upper pixel and ending at the right lower pixel of the spherical image (that is a so-called "Raster Scan method"). As illustrated in FIG. 20, the processes from step S2001 to step S2009 are looped by using a reflection process counter.

In step S2001, the image correction section 10F22 performs a process of converting into the polar coordinates ($\theta 1, \varphi 1$) on the spherical image corresponding to the coordinates (Xq,Yq) which are the arbitrary coordinates on the spherical image. The process of converting into the polar coordinates ($\theta 1, \varphi 1$) on the spherical image is a conversion process based on, for example, the following Formula 10.

$$\theta 1 = 2\pi \cdot \frac{Xq}{QW} \quad \text{Formula 10}$$

-continued $$\phi1 = \frac{\pi}{2} - Yq \cdot \frac{\pi}{QH}$$

Where, in Formula 10, the symbol "QW" denotes the length of the spherical image in the θ direction, the symbol "QH" denotes the length in the φ direction of the spherical image, and "Π" denotes the ratio of the circumference of a circle to its diameter. The unit of the angle herein is radian ("rad").

In step S2002, the image correction section 10F22 performs a process of calculating a distance "d" between the polar coordinates (θ1,φ1) and the projection surface. Specifically, the image correction section 10F22 calculates the distance "d" between the polar coordinates (θ1,φ1) calculated by the process in step S2001 and a coordinate value (θc,φc) of the center coordinates 4 of the projection surface indicated by the projection direction designation data which is input in step S2001.

FIG. 21A illustrates an example of the distance "d".

As illustrated in FIG. 21A, the distance "d" refers to a distance on a sphere having a radius of 1 (r=1) between the coordinates (θ1,φ1) in the spherical image and the coordinate value (θc,φc) of the center coordinates 4 of the projection surface.

In step S2003, based on the distance "d" calculated in step S2002, the image correction section 10F22 determines whether the coordinates (θ1,φ1) in the spherical image are in a projection range (i.e., in a range of the projection surface). Specifically, the image correction section 10F22 determines whether the coordinates (θ1,φ1) in the spherical image are in the projection range based on the following Formula 11.

$$d \leq \arctan(\sqrt{2} \cdot SR) \qquad \text{Formula 11}$$

Herein, the symbol "2SR" denotes the length of the projection surface. In step S2005 described below, the image correction section 10F22 performs a process of calculating the coordinates (Xp1,Yp1,−1) on the projection surface of the initial position corresponding to the three-dimensional coordinates (Xd,Yd,Zd). In the calculation, the calculation formula includes a trigonometric function. The trigonometric function is a periodic function which repeats every 180 degrees.

Due to characteristics of the trigonometric function, in step S2005 described below, as illustrated in FIG. 21B, the polar coordinates (θ2,φ2) on a symmetrical projection surface 71 which is symmetrical to the projection surface 7 relative to the origin fulfills the condition that is in the range on the projection surface 7. Namely, a symmetrical projection surface 81 which is symmetrical to a rotated projection surface 8 relative to the origin can be illustrated as in FIG. 21C. There are the polar coordinates (θ2,φ2) on the symmetrical projection surface 81 symmetrical to a rotated projection surface 8.

When the coordinates of the polar coordinates (θ2,φ2) are reflected, an unnecessary pixel is reflected, so that the image quality may be degraded. Therefore, the distance "d" is calculated based on the distance on the sphere having the radius of 1 (r=1). By calculating the distance "d" based on the distance on the sphere having the radius of 1 (r=1), the distance "d" can be calculated in a manner so that the polar coordinates (θ2,φ2) on the symmetrical projection surface 81 symmetrical to the rotated projection surface 8 are excluded.

FIG. 21D is an example front view of FIG. 21B. The distance "d" can be calculated as the product of an angle "Ang" and the radius "r". Here, since the radius is one (r=1), the distance "d" has the same value as that of the angle "Ang". When there are the polar coordinates (θ1,φ1) on the projection surface 7, the distance "d" becomes the greatest in the case of FIG. 21D. Therefore, whether the distance "d" is in the range on the projection surface is determined based on the above Formula 11.

When it is determined that the condition of Formula 11 is fulfilled (YES in step S2003), the process of the image correction section 10F22 goes to step S2004. When it is determined that the condition of Formula 11 is not fulfilled (NO in step S2003), the coordinates (Xq,Yq) are not the coordinates on the projection surface. Namely, the coordinates (Xq,Yq) are not the coordinates in the range which is designated as the output range. Therefore, it becomes possible to determine that it is not necessary to correct. Therefore, when it is determined that the condition of Formula 11 is not fulfilled (NO in step S2003), the process of the image correction section 10F22 goes to the next calculation on the next coordinates (Xq,Yq).

In step S2004, the image correction section 10F22 performs a process of calculating the three-dimensional coordinates (Xd,Yd,Zd) on the projection surface corresponding to the polar coordinates (θ1,φ1) on the spherical image. Specifically, in step S2004, the image correction section 10F22 performs a process of converting the coordinate values (θ1,φ1) in the polar coordinate system into the three-dimensional coordinate values (Xd,Yd,Zd) in the orthogonal coordinate system based on the following Formula 12.

$$Xd = \cos\theta1 \cdot \sin\phi1$$

$$Yd = \sin\theta1 \cdot \cos\phi1$$

$$Zd = \sin\theta1 \qquad \text{Formula 12}$$

In step S2005, the image correction section 10F22 performs a process of calculating the coordinates (Xp1,Yp1,−1) on the projection surface of the initial position corresponding to the three-dimensional coordinates (Xd,Yd,Zd). The projection surface of the initial position is the projection surface 7 in FIG. 14A. The process of calculating the coordinates (Xp1,Yp1,−1) on the projection surface of the initial position based on the three-dimensional coordinates (Xd,Yd,Zd) is performed by using, for example, the inverse matrix "R$^{-1}$" of the rotation matrix "R" of the above Formula 4. In step S1103 in FIG. 11, and in FIG. 14B, the image correction section 10F22 calculates the three-dimensional coordinates (Xd,Yd,Zd) based on the coordinates (Xp1,Yp1,−1) on the projection surface of the initial position by using the above rotation matrix R of the above Formula 4. Therefore, the process, which is the reverse conversion of the above process, of calculating the coordinates (Xp1, Yp1,−1) on the projection surface of the initial position based on the three-dimensional coordinates (Xd,Yd,Zd) is performed by using the inverse matrix "R$^{-1}$".

Note that the process of calculating the coordinates (Xp1, Yp1,−1) on the projection surface of the initial position based on the three-dimensional coordinates (Xd,Yd,Zd) is not limited to the calculation using the inverse matrix "R$^{-1}$" For example, the process may be performed by using the rotation matrix "R" while the sign(s) of the angles to be input are reversed from plus to minus and/or vice versa.

In step S2006, the image correction section 10F22 determines whether the coordinates (Xp1,Yp1−1) are positioned on the projection surface 7 based on the values of "Xp1" and "Yp1" calculated in step S2005. Specifically, the image correction section 10F22 determines whether the coordinates (Xp1,Yp1,−1) are positioned on the projection surface 7 based on whether both Formulas 13-1 and 13-2 are fulfilled.

$$-SR < Xp1 < SR \qquad \text{Formula 13-1}$$

$$-SR < Yp1 < SR \qquad \text{Formula 13-2}$$

When both Formulas 13-1 and 13-2 are fulfilled (YES in step S2006), the process of the image correction section 10F22 goes to step S2007. When either of Formula 13-1 or 13-2 is not fulfilled (NO in step S2006), the coordinates (Xp1,Yp1,−1) are not the coordinates on the projection surface. Namely, the coordinates (Xp1,Yp1,−1) are not the coordinates in the range which is designated as the output range. Therefore, it becomes possible to determine that it is not necessary to correct. Therefore, when it is determined that either one of Formula 13-1 or 13-2 is not fulfilled (NO in step S2006), the process of the image correction section 10F22 goes to the next calculation on the next coordinates (Xq,Yq).

In step S2007, the image correction section 10F22 performs a process of calculating the coordinates (Xp,Yp) on the plane having a length of one side of "L" corresponding to the coordinates (Xp1,Yp1,−1).

The image correction section 10F22 calculates the coordinates (Xp,Yp) on the plane having a length of one side of "L" corresponding to the coordinates (Xp1,Yp1,−1) on the projection surface 7 having a length of one side of "SR". Specifically, the image correction section 10F22 calculates the coordinate system (Xp,Yp) based on the following Formula 14.

$$Xp = SR - Xp1 \cdot \frac{L}{2 \cdot SR} \qquad \text{Formula 14}$$

$$Yp = SR - Yp1 \cdot \frac{L}{2 \cdot SR}$$

In step S2008, the image correction section 10F22 determines whether the coordinates (Xp,Yp) calculated in step S2007 are in an area to be masked.

The FIG. 21E illustrates an example where it is determined whether the coordinates (Xp,Yp) are in the area to be masked. The image correction section 10F22 generates the image data 95 that indicates the masked area as illustrated in FIG. 21E. As illustrated in FIG. 21E, the image data 95 is the image data on which the mask data 9 are reflected to the output image 6. In step S2008, as illustrated in FIG. 21E, the image correction section 10F22 determines whether the coordinates (Xp,Yp) calculated in step S2007 are in the masked area of the image data 95.

When it is determined that the coordinates (Xp,Yp) are in the masked area (YES in step S2008), the process of the image correction section 10F22 goes to step S2009. When it is determined that the coordinates (Xp,Yp) are not in the masked area (NO in step S2008), the coordinates (Xp,Yp) are not the coordinates which are designated by a user as the coordinates to be corrected. Therefore, it becomes possible to determine that it is not necessary to correct. Therefore, when it is determined that the coordinates (Xp,Yp) are not in the masked area, the process of the image correction section 10F22 goes to the next calculation on the next coordinates (Xq,Yq).

In step S2008, the image correction section 10F22 performs a process of correcting the pixels of the spherical image. The image correction section 10F22 corrects the pixels of the spherical image based on the brightness values of the masked pixels corrected by the process based on the similarity described with reference to FIG. 18. In the correction, the values of the pixels are generated by using, for example, the Bi-linear method described in step S1106 of FIG. 11 and FIG. 16.

The output image is not limited to an image on which image processing has been performed. For example, the output image may be a part of the image on which image processing has been performed. Also, a process of displaying an image in each step to a user may be performed.

In step S1110, the image correction section 10F22 performs a process of outputting the output image. The process of outputting the output image refers to, for example, a process of outputting the spherical image processed in step S1109 as the output image or a process of outputting the output image processed in step S1108.

Further, in the output image, for example, a process may be performed of correcting several non-masked pixels on the boundary between the masked pixels and the non-masked pixels. For example, among the masked pixels, the masked pixels within two pixels from the non-masked pixels may be corrected and the data input to the image processing apparatus 2 may be used for the other masked pixels. By performing the process by the two pixels, it becomes possible for a user to see the state where the parts designated by the user are gradually corrected.

Figure 22:
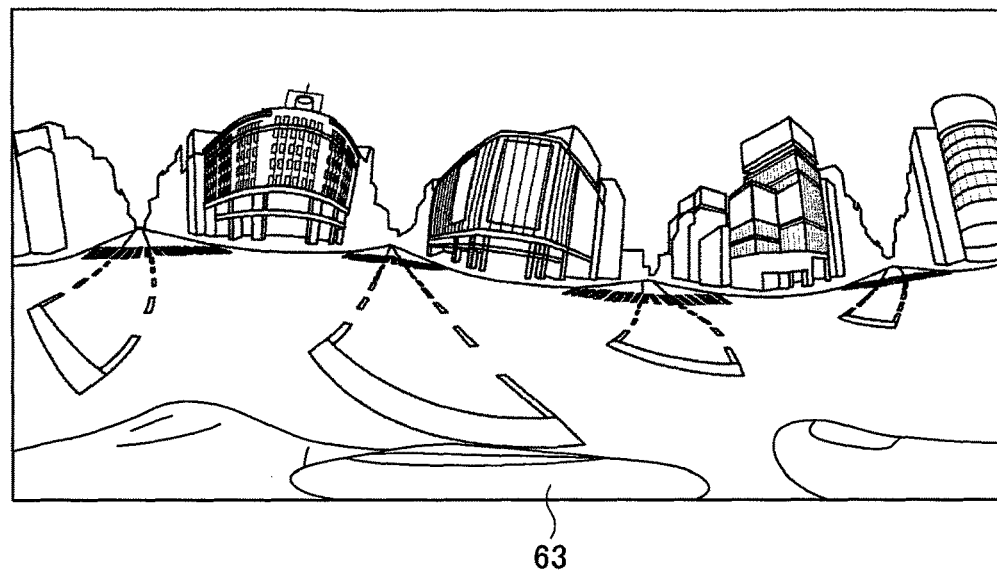
FIG. 22 is a drawing illustrating an example spherical image according to an embodiment of the present invention.

FIG. 22 illustrates an example spherical image according to an embodiment of the present invention.

In FIG. 22, for example, it is assumed that the human fingers appearing (imaged) on the lower side of the image are objects to be masked 63.

When it is assumed that the image of FIG. 22 is the output image and the object to be masked 63 is the area to be masked, a case is exemplarily described where the spherical image is output on which the processing in step S1109 of FIG. 11 is performed.

Figure 23:
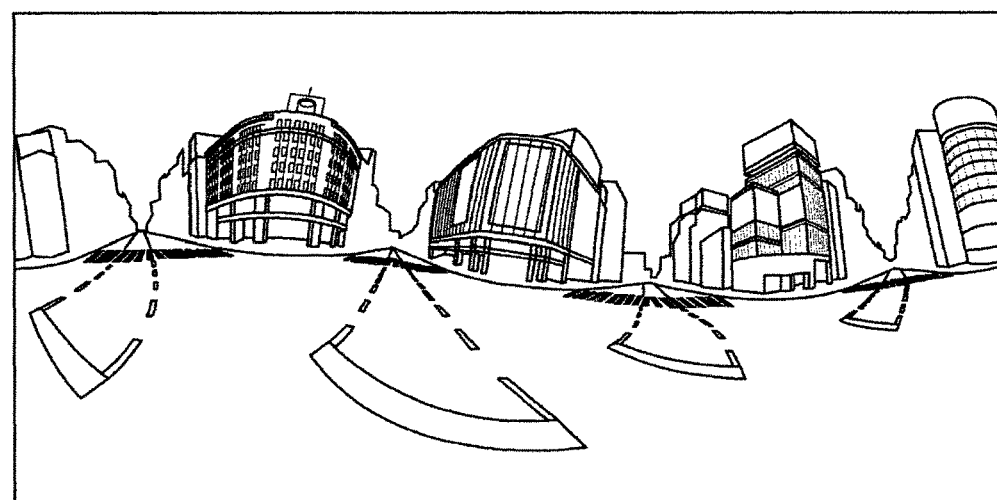
FIG. 23 is a drawing illustrating an example effect in the reflecting process onto the spherical image according to an embodiment of the present invention.

FIG. 23 illustrates an example effect obtained by a process of reflecting to the spherical image according to an embodiment of the present invention.

As illustrated in FIG. 23, by performing the process of reflecting to the spherical image, it becomes possible to correct an image in a manner that the object to be masked 63 can be deleted and a natural image can be output in the range where the object to be masked 63 was visible (imaged).

Figure 24:
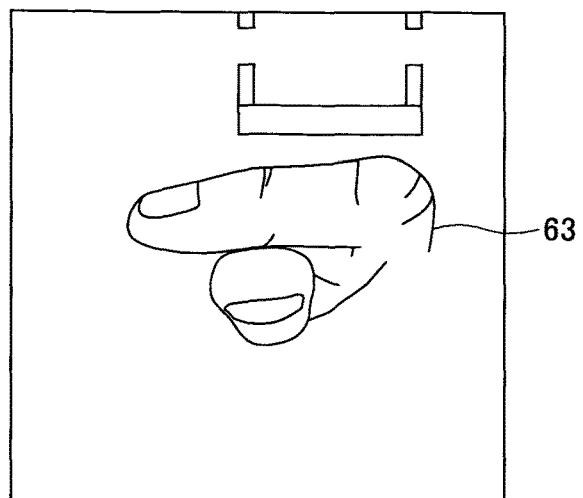
FIG. 24 is a drawing illustrating an example output image before the process based on the similarity according to an embodiment of the present invention.

FIG. 24 is a drawing illustrating an example of the output image before the process is performed based on the similarity according to an embodiment of the present invention.

FIG. 24 illustrates an example output image before being corrected when the spherical image of FIG. 22 is input to the image processing apparatus 2 and a user designates a range where the object to be masked 63 is visible (imaged) (i.e., an approximately lower half of the spherical image of FIG. 22) as the output range in step S1102 of FIG. 11.

As illustrated in FIG. 24, in the output image before correction, the object to be masked 63 is visible (imaged) (included).

Figure 25:
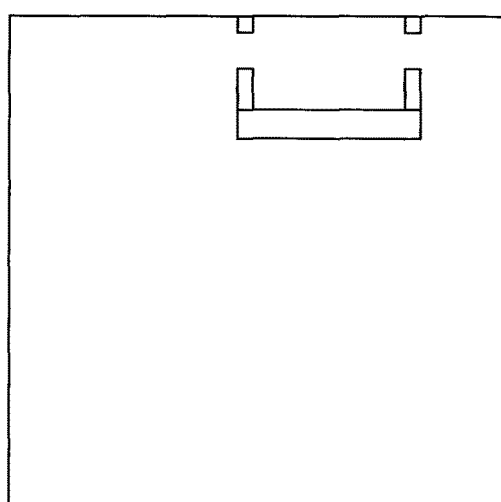
FIG. 25 is a drawing illustrating an example effect of the process based on the similarity according to an embodiment of the present invention.

FIG. 25 illustrates an example effect obtained by the process based on the similarity according to an embodiment of the present invention.

As illustrated in FIG. 25, in the output image, the object to be masked 63 is deleted (re), and a natural image is output in the range where the object to be masked 63 was visible (imaged).

Accordingly, in an image formed by the imaging system 10, it becomes possible to correct the image in a manner such that a natural image can be output in a part of the object to be imaged in the image.

Second Embodiment

In a second embodiment of the present invention, the imaging system 10 according to the first embodiment, the imaging device 1, and the image processing apparatus 2 are used. Therefore, the repeated descriptions of the imaging device 1, and the image processing apparatus 2 are herein omitted.

In the second embodiment, the overall process of the first embodiment described with reference to FIG. 8 is performed. In the second embodiment, the process by the image processing apparatus of FIG. 11 differs from that in the first embodiment.

Figure 26:
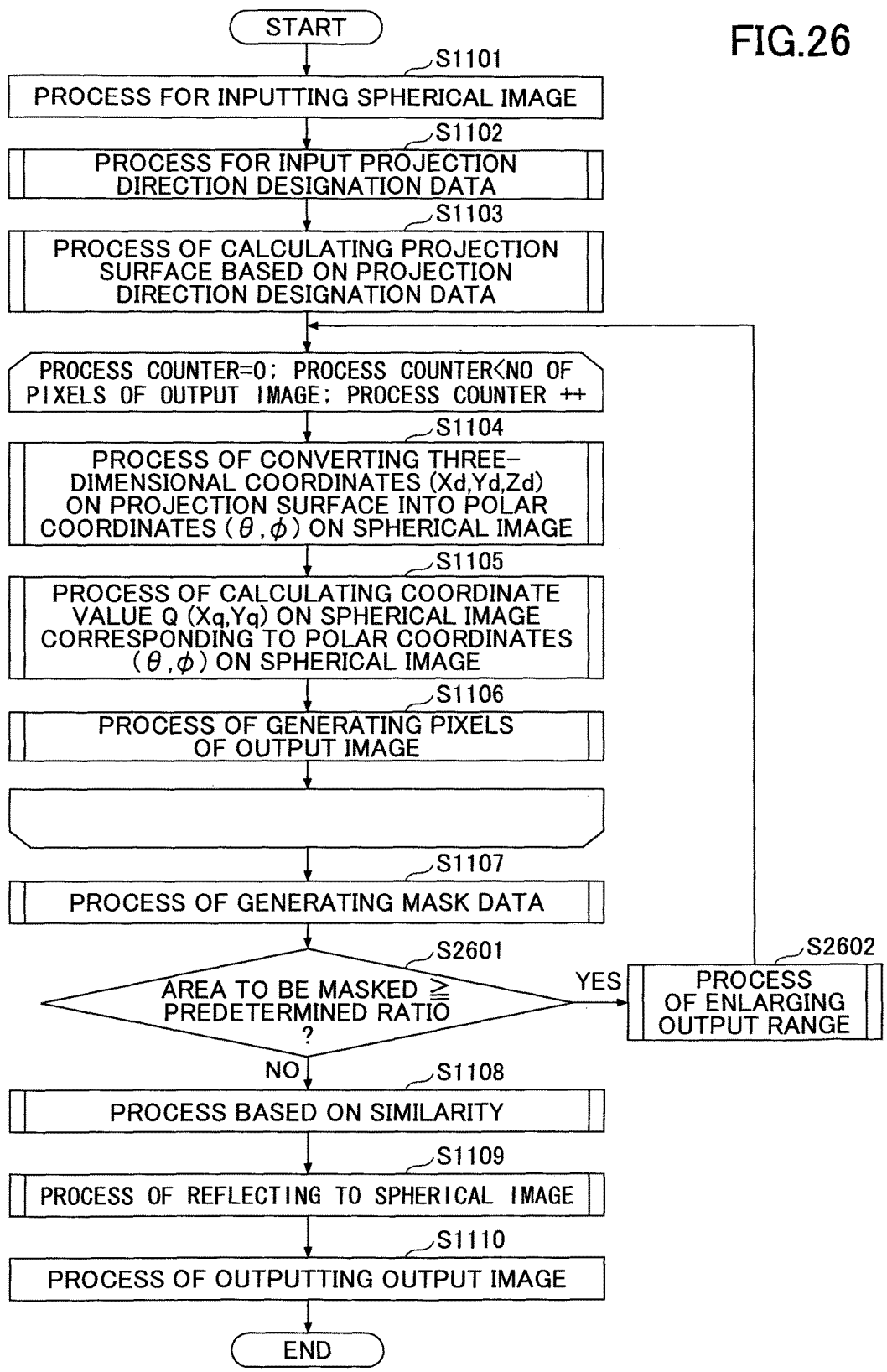
FIG. 26 is a flowchart illustrating an example process performed by the image processing apparatus according to a second embodiment of the present invention.

FIG. 26 is a flowchart of an example process performed by the image processing apparatus according to the second embodiment of the present invention. In FIG. 26, similar process names and reference numerals are used to describe the same process, etc., in FIG. 11 of the first embodiment, and the repeated descriptions thereof are herein omitted. The process in FIG. 26 of the second embodiment differs from that in FIG. 11 of the first embodiment in that the processes in steps S2601 and S2602 are added.

In step S2601, the image correction section 10F22 performs a masked area ratio determination process.

Figure 27A:
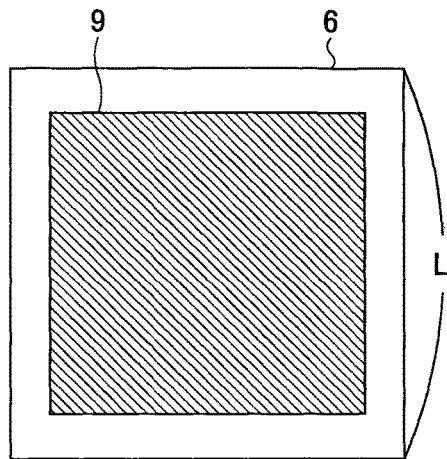
FIGS. 27A and 27B are drawings illustrating and example mask area ratio determination process according to the second embodiment of the present invention.

FIGS. 27A and 24B illustrate examples of the masked area ratio determination process according to the second embodiment of the present invention.

In the masked area ratio determination process, a ratio of the number of the masked pixels (mask data 9) to the number of the pixels in the designated output range is calculated. Then, if the ratio is of more than or equal to a predetermined value, it is determined that the masked area has a predetermined ratio or more.

In the following, an example is described where the number of the pixels in the designated output range is 100 (pixels) and the predetermined ratio is 50%.

FIG. 27A illustrates an example where the masked area is greater than or equal to the predetermined ratio. For example, when the range designated by the mask data 9 corresponds to 70 pixels, the ratio of the mask data 9 to the output range (100 pixels) is calculated as 70%. In the case of FIG. 27A, since the ratio of the masked pixels (mask data 9) to the output range is greater than or equal to the predetermined ratio (50%), the image correction section 10F22 determines that the masked area has the predetermined ratio or more (YES in step S2601), so that the process goes to step S2602.

Figure 27B:
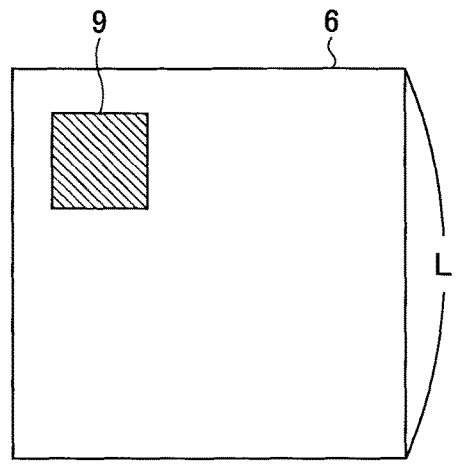

FIG. 27B illustrates an example where the masked area is less than the predetermined ratio. For example, when the range designated by the mask data 9 corresponds to 10 pixels, the ratio of the mask data 9 to the output range (100 pixels) is calculated as 10%. In the case of FIG. 27B, since the ratio of the masked pixels (mask data 9) to the output range is less than the predetermined ratio (50%), the image correction section 10F22 determines that masked area does not have the predetermined ratio or more (NO in step S2601), so that the process goes to step S1108.

Note that the predetermined ratio is a value that can arbitrarily be set by a user.

In the process in step S2602, the image correction section 10F22 performs a process of enlarging the output range.

Figure 28:
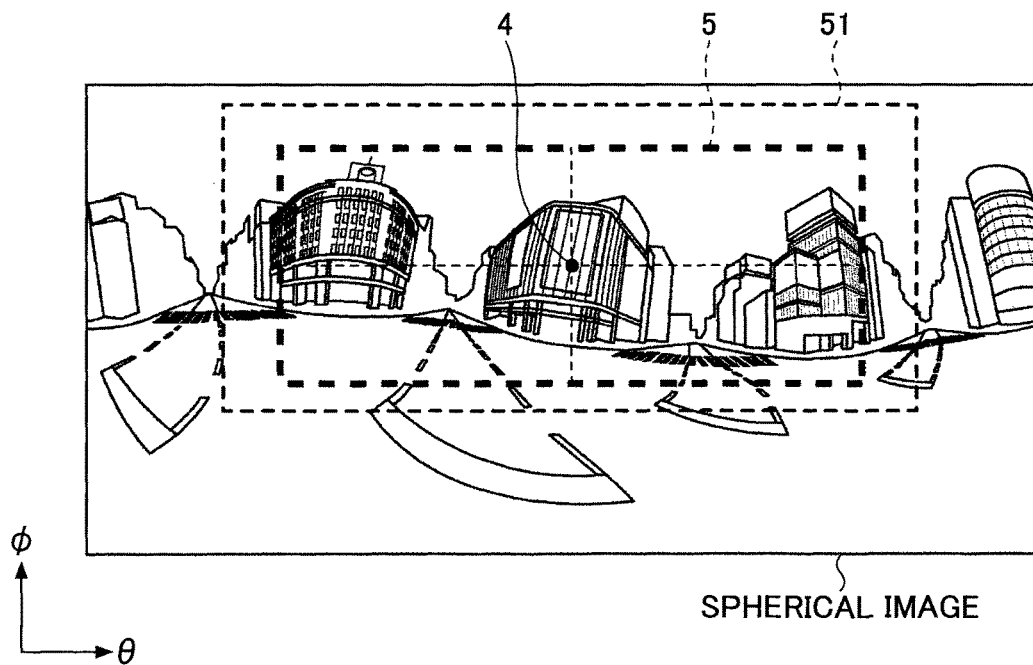
FIG. 28 is a drawing illustrating a process of enlarging an output range according to the second embodiment of the present invention.

FIG. 28 illustrates an example of the process of enlarging the output range according to the second embodiment of the present invention.

The process of enlarging the output range is a process of enlarging the output range in order to decrease the ratio of the masked pixels (mask data 9).

As illustrated in FIG. 28, the process of enlarging the output range is a process of setting an enlarged output range 51 in place of the output range 5 determined based on the center coordinates 4 indicated by the projection direction designation data of FIG. 13. For example, in the process of enlarging the output range, the number of the pixels is calculated where the ratio of the masked pixels (mask data 9) is less than the predetermined ratio in step S2601, and the enlarged output range 51 is set by changing the vertical and horizontal values of the output range by regarding the center coordinates 4 as the center of the enlargement.

Note that the method of setting the enlarged output range 51 is not limited to the above method. For example, the enlarged output range 51 may be set by expanding in at least one of the left, the right, the upward, and the downward directions.

Further, the enlargeable range of the enlarged output range 51 may be limited to an upper limit in order to reduce the distortion of the output image.

By setting the ratio the masked pixels (mask data 9) to be less than a predetermined ratio, it becomes possible to make the image quality of the output image higher by the subsequent process based on the similarity and perform the process based on the similarity faster.

Third Embodiment

In a third embodiment of the present invention, the imaging system 10 according to the first embodiment, the imaging device 1, and the image processing apparatus 2 are used. Therefore, the repeated descriptions of the imaging device 1, and the image processing apparatus 2 are herein omitted.

In the third embodiment, the overall process of the first embodiment described with reference to FIG. 8 is performed. In the third embodiment, the process by the image processing apparatus of FIG. 11 differs from that in the first embodiment.

FIG. 29 is a flowchart of an example process performed by the image processing apparatus according to the third embodiment of the present invention. In FIG. 29, similar process names and reference numerals are used to describe the same process, etc., in FIG. 11 of the first embodiment, and the repeated descriptions thereof are herein omitted. The process in FIG. 29 of the third embodiment differs from that in FIG. 11 of the first embodiment in that the processes in steps S2901 and S2902 are added.

In step S2901, the image correction section 10F22 performs a process of calculating the resolution of the output image and the spherical image, and determining whether the resolution of the output image is higher than that of the spherical image.

When it is determined that the resolution of the output image is higher than that of the spherical image (YES in step S2901), the process goes to step S2902. When it is determined that the resolution of the output image is not higher than that of the spherical image (NO in step S2901), the process of the image correction section 10F22 goes to step S1103.

The resolution refers to a density of the pixels and, for example, the number of the pixels to indicate a predetermined image.

In the process of step S2902, the image correction section 10F22 performs a process of reducing the output range. The process of reducing the output range is a process of reducing the number of the pixels designated based on the output range which becomes the output image. Here, the process of step S2902 is not limited to the process of reducing the output range. For example, the brightness values of a predetermined number of the pixels may be averaged, so that one pixel having the averaged brightness value is generated. This process is applied across the output image. By doing this, the number of the pixels may be reduced.

By setting the resolution of the output image to be less than or equal to the resolution of the spherical image, it may become possible to reduce the degradation of the image quality and reduce the processing time.

Fourth Embodiment

In a fourth embodiment of the present invention, the imaging system 10 according to the first embodiment, the imaging device 1, and the image processing apparatus 2 are used. Therefore, the repeated descriptions of the imaging device 1, and the image processing apparatus 2 are herein omitted.

In the fourth embodiment, the overall process of the first embodiment described with reference to FIG. 8 is performed. In the fourth embodiment, the process by the image processing apparatus of FIG. 11 differs from that in the first embodiment.

FIG. 30 is a flowchart of an example process performed by the image processing apparatus according to the fourth embodiment of the present invention. In FIG. 30, similar process names and reference numerals are used to describe the same process, etc., in FIG. 11 of the first embodiment, and the repeated descriptions thereof are herein omitted. The process in FIG. 30 of the fourth embodiment differs from that in FIG. 11 of the first embodiment in that the processes in steps S3001 and S3002 are added.

In step S3001, the image correction section 10F22 performs a process of calculating the resolution of the output image and the spherical image, and determines whether the difference between the resolution of the output image and the resolution of the spherical image is greater than or equal to a predetermined value.

The determination whether the difference between the resolution of the output image and the resolution of the spherical image is greater than or equal to the predetermined value refers to the determination whether the resolution of the output image and the resolution of the spherical image indicate a similar level of the number of the pixels. The predetermined value can be arbitrarily set by a user.

When it is determined that the difference between the resolution of the output image and the resolution of the spherical image is greater than or equal to the predetermined value (YES in step S3001), the process of the image correction section 10F22 goes to step S3002. When it is determined that the difference between the resolution of the output image and the resolution of the spherical image is not greater than or equal to the predetermined value (YES in step S3001), the process of the image correction section 10F22 goes to step S1103.

The resolution refers to a density of the pixels and, for example, the number of the pixels to indicate a predetermined image.

In the process of step S3002, the image correction section 10F22 performs a process of changing the output range. The process of changing the output range refers to a process so that the resolution of the output image is set to be equal or substantially equal to the resolution of the spherical image. For example, when the resolution of the output image is higher than that of the spherical image, the image correction section 10F22 performs a process of step S2902 in FIG. 29. For example, when the resolution of the output image is lower than that of the spherical image, the image correction section 10F22 performs a process of step S2602 in FIG. 26. Note that the process of step S3002 is not limited to the process of step S2602 in FIG. 26 or the process of step S2902 of FIG. 29. For example, the image correction section 10F22 may calculate the length of one side of the output range so that the resolution of the output image is equal or substantially equal to the resolution of the spherical image, and set the output range in a manner such that the length of the one side of the output range is equal to the calculated length.

By setting the resolution of the output image to be equal or substantially equal to the resolution of the spherical image, it may become possible to improve the image quality by improving the reproduction of the edge part in the image due to the reduction of the output where the resolution is degraded, and reduce the processing time.

Fifth Embodiment

In a fifth embodiment of the present invention, the imaging system 10 according to the first embodiment, the imaging device 1, and the image processing apparatus 2 are used. Therefore, the repeated descriptions of the imaging device 1, and the image processing apparatus 2 are herein omitted.

In the fifth embodiment, the overall process of the first embodiment described with reference to FIG. 8 is performed. In the fifth embodiment, the process based on the similarity in step S1811 in FIG. 11 differs from that in the first embodiment.

In the process of step S1810 according to the fifth embodiment, the determination condition in step S1810 is changed based on the number of pixels of the output image.

The change of the determination condition depending on the number of the pixels of the output image refers to the change of the determination condition so as to make it easier to determine that the similarity sum value has converged in step S1810 (YES in step S1810). Specifically, when the number of the pixels of the output image is greater than or equal to a predetermined number of the pixels, for example, the determination condition is changed when at least one of the conditions of Formulas 8 and 9 is fulfilled. Note that the change of the determination conditions is not limited to the number of the Formulas that fulfill the conditions. For example, the change of the determination condition refers to the change of the threshold values in Formulas 8 and 9.

The image processing apparatus 2 may be realized by a computer-executable program described in a legacy program language such as assembler, C, C++, C#, and Java (registered trademark), etc., or an object oriented programming language, etc. Such a program may be stored in a recording medium such as a ROM, an Electrically Erasable Programmable ROM (EEPROM), etc., to be distributed. Further, such a program may be stored in a recording medium such as a flash memory, a flexible disk, a CD-ROM, a CD-RW, a DVD-ROM, a DVD-RAM, a DVD-RW, etc., to be distributed. Further, such a program may be stored in a device-readable recording medium such as a Blu-ray Disc, an SD (registered trademark) card, an MO disk, etc., and distributed by using the device-readable recording medium or via electrical telecommunication lines.

Further, a part or all of the functions may be implemented on a programmable device (PD) such as a Field Programmable Gate Array (FPGA), etc. Further, a part or all of the functions may be implemented as an Application Specific Integrated Circuit (ASIC).

A part or all of the functions may be described in a circuit configuration data (bit stream data) to be downloaded into the PD or in a Hardware Description Language (HDL) for generating the circuit configuration data, etc., and downloaded into the PD to be realized. Further, a part or all the functions may be described in a Very High Speed Integrated Circuit (VHSIC) HDL (VHDL) or a Verilog-HDL, and downloaded into the PD to be realized.

Although the invention has been described with respect to specific embodiments for a complete and clear disclosure, the appended claims are not to be thus limited but are to be construed as embodying, all modifications and alternative constructions that may occur to one skilled in the art that fairly fall within the basic teachings herein set forth.

The present application is based on and claims the benefit of priority of Japanese Patent Application No. 2013-264019 filed Dec. 20, 2013, the entire contents of which are hereby incorporated herein by reference.

DESCRIPTION OF THE REFERENCE NUMERALS

1: IMAGING DEVICE
2: IMAGE PROCESSING APPARATUS
10: IMAGING SYSTEM
10F1: SPHERICAL IMAGE GENERATING SECTION
10F11: IMAGING SECTION
10F12: GENERATING SECTION
10F13: OUTPUT SECTION
10F2: IMAGE PROCESSING SECTION
10F21: INPUT SECTION
10F211: PARAMETER INPUT SECTION
10F212: IMAGE INPUT SECTION
10F22: IMAGE CORRECTION SECTION
10F221: MASK SECTION
10F222: SIMILARITY CALCULATION SECTION
10F223: CORRECTION SECTION
10F23: DISPLAY SECTION
10F24: STORAGE SECTION
3: INSCRIBED SPHERE
4: CENTER COORDINATES
5: OUTPUT RANGE
51: ENLARGED OUTPUT RANGE
6: OUTPUT IMAGE
61: FIRST OBJECT TO BE IMAGED
62: SECOND OBJECT TO BE IMAGED
63: OBJECT TO BE MASKED
7: PROJECTION SURFACE
71: SYMMETRICAL PROJECTION SURFACE
8: ROTATED PROJECTION SURFACE
81: SYMMETRICAL PROJECTION SURFACE
9: MASK DATA
91: DESIGNATION AREA
92: FIRST MASK PIXEL CALCULATION DATA
93: SECOND MASK PIXEL CALCULATION DATA
94: THIRD MASK PIXEL CALCULATION DATA
95: IMAGE DATA

PRIOR ART DOCUMENTS

Patent Document

[Patent Document 1] Japanese Laid-open Patent Publication No. 2011-35567
[Patent Document 2] Japanese Patent No. 4242381
[Patent Document 3] International Publication Pamphlet No. WO2009-142333

Non-Patent Document

[Non-patent Document 1] Kotaro Machikita, et al., "Realization of Omnidirectional Telepresence without Invisible Areas Using an Omnidirectional Camera Based on Video Inpainting", Meeting on Image Recognition and Understanding, July 2009

The invention claimed is:

1. An image generating apparatus for generating an output image based on an input panorama image, comprising:
a processor; and
a memory including a program that, when executed by the processor, causes the processor to:
input an output range parameter and a correction parameter, the output range parameter designating an output range in the panorama image, the correction parameter designating a correction part that is to be masked in the output image,
mask the correction part designated by the correction parameter in the output image,
calculate a similarity between the correction part and peripheral pixels and mask the correction part in the output image based on the similarity and the peripheral pixels,
generate the output image from the output range of the panorama image, the output range being designated by the output range parameter, and the output image is the panorama image in which the correction part is deleted through the correction,
set a first projection surface indicating a surface of a range to be output to the output image,
set a second projection surface formed by moving the first projection surface to an area indicated by the output range parameter,
set first coordinates on the first projection surface,
set second coordinates, which correspond to the first coordinates, on the second projection surface,
set a sphere inscribed in the first projection surface and the second projection surface, and
calculate a distance between the first coordinates on the first projection surface and the second coordinates on the second projection surface based on an arc length calculated based on a radius of the sphere and a length of one side of the first projection surface.

2. The image generating apparatus according to claim 1, wherein execution of the program further causes the processor to calculate the similarity more than once by using a number of pixels or a resolution of the output image or the output image whose direction has been changed.

3. The image generating apparatus according to claim 1, wherein execution of the program further causes the processor to change the output range based on a ratio of the correction part to the output range.

4. The image generating apparatus according to claim 3, wherein the change of the output range is to enlarge the output range.

5. The image generating apparatus according to claim 3, wherein the change of the output range is to decrease a number of pixels of the output range.

6. The image generating apparatus according to claim 3, wherein the change of the output range is to change a number of pixels of the output range to be equal or substantially equal to a resolution of the panorama image.

7. The image generating apparatus according to claim 1, wherein execution of the program further causes the processor to correct the correction part in the output image more than once while determining whether to further correct before each correction based on a number of pixels of the output image.

8. An image generating method of generating an output image based on an input panorama image, comprising:

a parameter input step of inputting an output range parameter and a correction parameter, the output range parameter designating an output range in the panorama image, the correction parameter designating a correction part that is to be masked in the output image; and an image correction step of masking the correction part designated by the correction parameter in the output image, wherein in the image correction step, a similarity between the correction part and peripheral pixels is calculated, and the correction part in the output image is masked based on the similarity and the peripheral pixels, the output image is generated from the output range of the panorama image, the output range being designated by the output range parameter, and the output image is the panorama image in which the correction part is deleted through the correction, a first projection surface is set, the first projection surface indicating a surface of a range to be output to the output image, a second projection surface formed by moving the first projection surface to an area indicated by the output range parameter, first coordinates are set on the first projection surface, second coordinates, which correspond to the first coordinates, are set on the second projection surface, a sphere is inscribed in the first projection surface and the second projection surface, and a distance between the first coordinates on the first projection surface and the second coordinates on the second projection surface is calculated based on an arc length calculated based on a radius of the sphere and a length of one side of the first projection surface.

9. A non-transitory computer-readable recording medium having stored therein a program for causing a computer to perform an image generating method of generating an output image based on an input panorama image, the image generating method including:

a parameter input step of inputting an output range parameter and a correction parameter, the output range parameter designating an output range in the panorama image, the correction parameter designating a correction part that is to be masked in the output image; and an image correction step of masking and deleting the correction part designated by the correction parameter in the output image, wherein in the image correction step, a similarity between the correction part and peripheral pixels is calculated, and the correction part in the output image is masked based on the similarity and the peripheral pixels, the output image is generated from the output range of the panorama image, the output range being designated by the output range parameter, and the output image is the panorama image in which the correction part is deleted through the correction, a first projection surface is set, the first projection surface indicating a surface of a range to be output to the output image, a second projection surface formed by moving the first projection surface to an area indicated by the output range parameter, first coordinates are set on the first projection surface, second coordinates, which correspond to the first coordinates, are set on the second projection surface, a sphere is inscribed in the first projection surface and the second projection surface, and a distance between the first coordinates on the first projection surface and the second coordinates on the second projection surface is calculated based on an arc length calculated based on a radius of the sphere and a length of one side of the first projection surface.

10. The image generating apparatus according to claim 1, wherein the processor determines whether the first coordinates are in the output range based on the following formula:

$$d \leq \arc\tan(\sqrt{2 \cdot SR})$$

in which $2 \cdot SR$ denotes the length of the projection surface, and in the case where the condition of the formula is satisfied, the processor determines that the first coordinates are within the output range, and includes the first coordinates in the correction part; and in the case where the condition of the formula is not satisfied, the processor determines that the first coordinates are not within the output range, and excludes the first coordinates from the correction part.

* * * * *